United States Patent
Yamano

(10) Patent No.: US 7,103,354 B2
(45) Date of Patent: Sep. 5, 2006

(54) NODE STRUCTURE INFORMATION MANAGEMENT METHOD AND RADIO NETWORK SYSTEM

(75) Inventor: Koji Yamano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 661 days.

(21) Appl. No.: 10/415,458

(22) PCT Filed: Sep. 4, 2001

(86) PCT No.: PCT/JP01/07659

§ 371 (c)(1),
(2), (4) Date: Apr. 29, 2003

(87) PCT Pub. No.: WO02/37766

PCT Pub. Date: May 10, 2002

(65) Prior Publication Data

US 2004/0032625 A1    Feb. 19, 2004

(30) Foreign Application Priority Data

Oct. 30, 2000   (JP)   .............................. 2000-330570

(51) Int. Cl.
*H04M 3/00* (2006.01)
(52) U.S. Cl. ....................... 455/418; 455/420
(58) Field of Classification Search ...... 455/3.01–3.06, 455/418, 419, 420, 412, 422.1, 432.3, 500, 455/502; 370/395.31, 395.4, 512
See application file for complete search history.

(56) References Cited

U.S. PATENT DOCUMENTS

| | | | |
|---|---|---|---|
| 5,450,482 A | * | 9/1995 | Chen et al. .................. 379/230 |
| 5,581,704 A | | 12/1996 | Barbara et al. |
| 5,694,596 A | | 12/1997 | Campbell |
| 5,841,972 A | | 11/1998 | Fanshier |
| 5,860,058 A | * | 1/1999 | Daniel et al. ............... 455/12.1 |

(Continued)

FOREIGN PATENT DOCUMENTS

EP    0 876 029 A2    11/1998

(Continued)

*Primary Examiner*—Benny Tieu
(74) *Attorney, Agent, or Firm*—David G. Conlin; Steven M. Jensen; Edwards Angell Palmer & Dodge, LLP

(57) ABSTRACT

A node configuration information management method and a wireless network system whereby node configuration information about a wireless bus comprising a hub station and a plurality of nodes is managed by the hub station in a centralized manner so that the hub station can share the latest node configuration information with all of the nodes. According to the node configuration information management method, when the node information in the wireless bus 11 is modified, a node notifies the hub station of the modification via a modification notifying packet. Further, 1) Each node and the hub station store the node configuration information about each node in a node configuration information table, and the hub station has a counter for managing the updating of the node configuration information table as a whole and transmits a count in each frame; 2) The hub station, upon reception of the node configuration modification notification from the node, updates its own node configuration information table, and broadcasts update information to all of the nodes; 3) The node receives the modification information and updates its own node configuration information table, while receiving the count transmitted in each frame, determining if there is updating on the part of the hub station, requesting retransmission of differential information concerning the difference, if any, from its own node configuration information table, and updating its own node configuration information table.

12 Claims, 25 Drawing Sheets

U.S. PATENT DOCUMENTS

| | | |
|---|---|---|
| 5,999,947 A | 12/1999 | Zollinger et al. |
| 6,032,183 A | 2/2000 | Chen et al. |
| 6,134,454 A * | 10/2000 | Foladare et al. ......... 455/556.2 |
| 6,295,353 B1 * | 9/2001 | Flockhart et al. ...... 379/265.02 |
| 6,397,060 B1 * | 5/2002 | Oikawa ...................... 455/420 |
| 6,446,082 B1 * | 9/2002 | Arita ....................... 707/104.1 |
| 6,453,346 B1 * | 9/2002 | Garg et al. ................. 709/224 |
| 6,763,396 B1 * | 7/2004 | Torikai ....................... 709/250 |
| 6,782,553 B1 * | 8/2004 | Ogawa et al. .............. 725/146 |
| 6,993,348 B1 * | 1/2006 | Ikegami et al. .......... 455/456.3 |

FOREIGN PATENT DOCUMENTS

| | | |
|---|---|---|
| EP | 0 926 608 A2 | 6/1999 |
| JP | 6-237271 | 8/1994 |
| JP | 10-098469 | 4/1998 |
| JP | 11-041271 | 2/1999 |
| JP | 11-088396 | 3/1999 |
| JP | 11-215135 | 8/1999 |
| JP | 2000-137661 | 5/2000 |
| JP | 2000-207337 | 7/2000 |
| WO | WO-97/09800 | 3/1997 |
| WO | WO-97/21177 | 6/1997 |
| WO | WO-00/44132 | 7/2000 |

\* cited by examiner

FRAME START PACKET (30) (HUB STATION→NODE)

NODE CONFIGURATION MODIFICATION
NOTIFYING PACKET (40) (NODE→HUB STATION)

NODE CONFIGURATION INFORMATION
REQUEST PACKET (50) (NODE→HUB STATION)

NODE CONFIGURATION MANAGEMENT BLOCKS ON THE PART OF HUB STATION

NODE CONFIGURATION MANAGEMENT BLOCKS ON NODE SIDE

FIG. 9

HUB STATION STORES THE LAST-UPDATED COUNTER VALUE

| CURRENT COUNT | NODE NUMBER #Node | COUNT UPON UPDATE C_{Hub} | NODE INFORMATION (UNIQUE IDENTIFIER + SYSTEM PARAMETER) |
|---|---|---|---|
| <13> | 0 | <12> | <> |
| | 1 | <11> | <> |
| | 2 | <5> | <> |
| | 3 | <7> | <> |
| | 4 | <13> | <> |
| | ⋮ | ⋮ | ⋮ |
| | m-1 | <4> | <> |
| | m | <10> | <> |

NODE CONFIGURATION INFORMATION TABLE POSSESSED BY HUB STATION 72

FIG. 10

NODE STORES THE LAST-UPDATED COUNTER VALUE

| COUNT UPON UPDATE C_{Node} | NODE NUMBER #Node | NODE INFORMATION (UNIQUE IDENTIFIER + SYSTEM PARAMETER) |
|---|---|---|
| <13> | 0 | <> |
| | 1 | <> |
| | 2 | <> |
| | 3 | <> |
| | 4 | <> |
| | ⋮ | ⋮ |
| | m-1 | <> |
| | m | <> |

NODE CONFIGURATION INFORMATION TABLE POSSESSED BY NODE 81

SEQUENCE OF NODE INFORMATION NOTIFYING PROCESS (1) ON NODE SIDE

SEQUENCE OF NODE CONFIGURATION UPDATE
PROCESS (2) ON HUB STATION SIDE

SEQUENCE OF NODE CONFIGURATION INFORMATION
NOTIFYING PROCESS (3) ON HUB STATION SIDE

FRAME START PACKET (100) (HUB STATION→NODE)

NODE CONFIGURATION MODIFICATION
NOTIFYING PACKET (110) (NODE→HUB STATION)

NODE CONFIGURATION MANAGEMENT BLOCKS ON HUB STATION SIDE

NODE CONFIGURATION MANAGEMENT BLOCKS ON NODE SIDE

FIG.24

| CURRENT COUNT | NODE NUMBER #Node | COUNT IN EACH NODE UPON UPDATE — COUNT UPON UPDATE C_{Hub} | COUNT TRANSMITTED IN EACH FRAME — NODE COUNT NUMBER C_{Node} | NODE INFORMATION (UNIQUE IDENTIFIER + SYSTEM PARAMETER) |
|---|---|---|---|---|
| <13> | 0 | <12> | <13> | <> |
| | 1 | <11> | <13> | <> |
| | 2 | <9> | <12> | <> |
| | 3 | <7> | <13> | <> |
| | 4 | <13> | <13> | <> |
| | ⋮ | ⋮ | ⋮ | ⋮ |
| | m-1 | <4> | <13> | <> |
| | m | <10> | <13> | <> |

NODE CONFIGURATION INFORMATION TABLE POSSESSED BY HUB STATION 142

FIG.25

| COUNT UPON UPDATE C_{Node} | NODE NUMBER #Node | NODE INFORMATION (UNIQUE IDENTIFIER + SYSTEM PARAMETER) |
|---|---|---|
| <13> | 0 | <> |
| | 1 | <> |
| | 2 | <> |
| | 3 | <> |
| | 4 | <> |
| | ⋮ | ⋮ |
| | m-1 | <> |
| | m | <> |

NODE CONFIGURATION INFORMATION TABLE POSSESSED BY NODE 151

SEQUENCE OF NODE INFORMATION NOTIFYING PROCESS (6) ON NODE SIDE

SEQUENCE OF NODE CONFIGURATION
UPDATE PROCESS (7) ON HUB STATION SIDE

SEQUENCE OF UPDATE PROCEDURE (8) ON NODE SIDE

NODE STRUCTURE INFORMATION MANAGEMENT METHOD AND RADIO NETWORK SYSTEM

TECHNICAL FIELD

The present invention relates to a method of managing node configuration information in a wireless network environment comprised of a hub station and a plurality of terminals, whereby the node configuration information in the network is managed by the hub station in a centralized manner. The invention also relates to a wireless network system.

BACKGROUND ART

Recently, attention is being focused on network systems in which multiple electrical household appliances are connected by cables for transmission and reception of voice and image data. For example, it is now common to watch videos shot with a digital video camera by connecting the camera to a monitor by cables, or to edit images by connecting the camera to a video apparatus. More recently, there is a trend of building such network systems not with cables but wirelessly. Wireless transmission and reception provides an advantage in that the troublesome aspects of wiring devices can be eliminated. An example of such a wireless network (to be referred to as a wireless bus) will be described below.

FIG. 32 shows a block diagram of a configuration of terminals and a hub station in a wireless bus. Numeral 1 designates a wireless bus (wireless network), 2 a hub station, and 3–6 nodes formed by multiple terminals. The wireless bus 1 includes a plurality of devices called nodes, and multimedia data is transmitted and received among the nodes. The transmission and reception of the data are managed by the hub station 2. In order to enable inter-node wireless communication, the nodes 3 to 6 in the wireless bus 1 have memory regions for storing node configuration information concerning the wireless bus 1, node information about each node, and inter-node communication quality information. The hub station 2 is selected from those of the nodes 3 to 6 in the wireless bus 1 that have the functions required of a hub station. One prerequisite for a node to become the hub station 2 is that the node be located at a position that allows it to communicate with every other node in the wireless bus 1. The hub station 2 is also required to have functions for gathering and analyzing the node configuration information, node information for each node, and inter-node communication quality information transmitted from the nodes 3 to 6, so that it can manage the latest information.

Hereafter, the node configuration information, node information, and inter-node communication quality information managed by the hub station 2 will be described.

The node configuration information indicates whether or not the individual nodes 3 to 6, which are centrally managed by the hub station 2, can carry out communication. When there is a change in the node configuration in the wireless bus 1, such as when a node is newly registered or deleted, the node configuration information is updated. The node information indicates the function of each node. Of the nodes participating in the wireless bus 1, some have the functions of the hub station 2, some have relay capability, and some have only an asynchronous communication function. In order to build the wireless bus 1, it is necessary to check the functions of the individual nodes and then select a hub station from among the nodes having a management function.

The node configuration information and the node information are updated only when a node is newly registered or deleted in the wireless bus 1, or the function of a node is changed. These items of information are not modified for any other reason.

The communication quality information indicates the states of communication condition between individual nodes when data is transmitted or received wirelessly. When a wireless bus is constructed in a wireless environment, it is necessary to select an appropriate transmission method adapted to the conditions of communication paths, so that accurate transmission and reception can take place. However, a wireless transmission path could deteriorate when a node has been transported or when there are people or obstacles located between two nodes, for example, making it impossible to transmit or receive data. Thus, the communication path conditions among the individual nodes vary on a case-by-case basis, and so the hub station must receive the communication path conditions from the nodes and manage them.

As an example of the method of managing the information mentioned above, JP Patent Publication (Unexamined Application) No. 11-88396 discloses an apparatus for managing node configuration information in a network of a plurality of nodes connected by cables. In this example, each node carries a table for the management of the node configuration information in the network. Each time the node configuration is updated, the node configuration information is transmitted to other nodes, so that there are no discrepancies regarding the node configuration information carried by the individual nodes in the network. This example is wired and involves only node configuration information. Further, JP Patent Publication (Unexamined Application) No. 11-215135 discloses a method of managing the quality of individual communication paths in a wireless network comprised of a plurality of nodes. In this example, a hub station is selected from among the multiple nodes, and the hub station centrally manages the communication path quality information in the wireless network. Each node in the wireless network transmits its own management information to all of the other nodes. Each node receives the management information from all of the other nodes in the wireless network and evaluates it. The nodes then transmit management information results to the hub station, which in turn overwrites this information on the communication quality information table. This example is wireless and involves only communication quality information.

These conventional node configuration information management methods have the following problems. In the communication apparatus disclosed in JP Patent Publication (Unexamined Application) No. 11-88396, each time the node configuration is updated as the number of nodes increases, node configuration information corresponding to the number of nodes must be transmitted. This results in an increase in overhead. Further, the hub station must wait until it receives an Ack signal from all of the nodes to which the hub station has transmitted.

While this management method creates no problems in the case of wired examples, it would not be an efficient method for wireless communication with limited frequency resources, because no other data can be transmitted while waiting for an Ack signal. Further, in a wired environment using cables, for example, the communication conditions among the nodes are fixed, so in this case there is no need to recognize the communication quality conditions. For these reasons, there is no description of a method of managing communication quality information. On the other hand, JP Patent Publication (Unexamined Application) No. 11-215135, which relates to a wireless communication method, does not describe the method of managing node configuration information. It is possible to transmit node configuration information by adding it to the above-described communication quality information. However, while the communication quality information varies depending on communication conditions, node configuration information is updated upon registration of a new node, deletion of a node, or when there is a change in a node. Accordingly, inserting the node configuration information in each frame and thus notifying the hub station would be redundant and could not be called an efficient method for wireless communication with limited frequency resources.

In view of these problems of the prior art, it is an object of the invention to provide a node configuration information management method and a wireless network system whereby node configuration information in a wireless bus comprised of a hub station and multiple nodes is managed by the hub station in a centralized manner. This is carried out in a manner such that the hub station can share the latest node configuration information with all of the nodes.

It is another object of the invention to provide a node configuration information management method and a wireless network system whereby node configuration information in a wireless bus comprised of a hub station and multiple nodes is centrally managed by the hub station in each frame. This is carried out in a manner such that the hub station can share the latest node configuration information with all of the nodes in the wireless bus within a minimum frame.

SUMMARY OF THE INVENTION

A method of managing node configuration in a wireless network according to the invention comprises a hub station and a plurality of nodes, wherein the hub station has a hub station management table for managing unique information about each of the nodes, wherein the updating of the hub station management table is managed by first update timing information which is transmitted to all of the nodes periodically, wherein if the hub station management table is modified, modification information is transmitted to all of the nodes together with the first update timing information, wherein each node has a node management table for managing the unique information about the node, wherein the node receives the first update timing information and the modification information, compares the first update timing information in its own management table with the first update timing information transmitted from the hub station, and rewrites its own management table based on the modification information if its own update timing information is older.

According to this method, even if a node has failed to receive the differential unique information transmitted from the hub station, the node can acquire the subsequently transmitted update timing and compare it with the update timing possessed by the node, so that the node can recognize that its own table is old. Thus, because the differential portion of the unique information is transmitted only when there is a modified portion, the node configuration information can be managed without requiring any redundant data transmission.

A method of managing node configuration in a wireless network according to the invention comprises a hub station and a plurality of nodes, wherein the hub station has a hub station management table for managing unique information about each of the nodes, wherein the updating of the hub station management table is managed based on first update timing information that is transmitted to all of the nodes periodically, wherein each node has a node management table for managing the unique information about the node, wherein the node receives the first update timing information and compares the first update timing information in its own management table with the first update timing information transmitted from the hub station, wherein the node requests the transmission of the unique information data if its own update timing information is old, and rewrites its own management table based on the unique information data transmitted from the hub station in response to the request.

According to this method, when a node has failed to receive the update data, the node requests the hub station to transmit differential data in the unique information. Thus, even if a node has failed to receive the latest unique information as a differential portion, the node can request the retransmission of the differential unique information and update based on the returned unique information, thus enabling accurate management of the node configuration information.

More preferably, the unique information data transmitted from the hub station in accordance with the request from the node for the unique information data is differential data including only the unique information about a node that has been added, modified, or deleted subsequent to the update timing information possessed by the node. Thus, because the differential unique information is transmitted only when there is a modified portion, the node configuration information can be managed without carrying out redundant data transmission.

A method of managing node configuration in a wireless network according to the invention comprises a hub station and a plurality of nodes, wherein the hub station has a hub station management table for managing the unique information about each node, wherein the updating of the hub station management table is managed based on first update timing information, wherein each node has a node management table for managing unique information about each node, wherein the updating of the node management table is managed based on the first update timing information, the node periodically transmitting the first update timing information that it manages to the hub station, wherein the hub station compares its own first update timing information with the first update timing information transmitted from each node periodically, the hub station creating the unique information data if the two items of information are different and transmitting it to the corresponding node, wherein the node rewrites its own management table based on the data transmitted from the hub station.

Preferably, the hub station compares the first update timing information periodically transmitted from each node with its own first update timing information, and, if there is a difference, the hub station creates unique information differential data corresponding to the difference and transmits it to the relevant node.

Preferably, the hub station periodically transmits the first update timing information to all of the nodes and, if the management table is modified, the hub station transmits modification information to all of the nodes together with the first update timing information.

Thus, the hub station transmits the node configuration update information together with the update timing. The node periodically transmits the update timing to the hub station. The hub station compares its own update timing, and retransmits the update information to any nodes that are not synchronized. In this way, information can be managed reliably.

Further, the first update timing information may be sequentially updated, wherein, if the first update timing information of the node is older than the first update timing information transmitted from the hub station by more than two, the node requests the hub station, together with the update timing information of its own, to transmit the relevant differential data. In this way, even if a node has failed to receive the unique information twice or more that is transmitted as a differential portion, the node can recognize this fact by comparing its own update timing with the update timing transmitted from the hub station. The node can then request the hub station to undertake retransmission together with its own update timing, acquire the differential data, and update its own management table. Thus, information can be accurately managed.

The hub station may manage the updating of the unique information about each node based on second update timing information in the hub station management table, wherein the hub station compares the first update timing information transmitted from each node with the second update timing information of the relevant node in order to select differential data. In this manner, the node configuration information can be accurately managed.

More preferably, the hub station may compare the update timing transmitted from the node with the second update timing and select the differential data if its own is older.

A frame structure for wireless communication includes a region for transmitting the first update timing information managed by the hub station to all of the nodes, a region for transmitting the unique information about each node, a region for the hub station to transmit modified portion of the unique information to all of the nodes, and a data region for transmitting and receiving normal data, wherein each node makes a retransmission request to the hub station individually using the data region, the hub station transmitting differential data in response to the retransmission request made using the data region. In this manner, the node configuration information can be accurately managed.

Further, a frame structure for wireless transmission includes a region for transmitting the unique information about each node, a region for the hub station to transmit a modified portion of the unique information to all of the nodes, and a data region for transmitting and receiving normal data, wherein the node makes a retransmission request to the hub station individually using the data region, the hub station transmitting differential data in response to the retransmission request made using the data region. In this manner, information can be accurately managed.

A wireless network system according to the invention comprises a hub station and a plurality of nodes, wherein the hub station has a hub station management table for managing unique information about each node based on first update timing information, a detection means for detecting a modification in the node configuration, an update means for updating the hub station management table in accordance with the result of detection by the detection means, and a transmitter for transmitting, if there is a modification in the hub station management table, modification information to all of the nodes together with the first update timing information, as well as transmitting the first update timing information to all of the nodes periodically, wherein each node has a node management table for managing the unique information about the node based on the first update timing information, a receiver for receiving the first update timing information, and an update means for comparing the first update timing information in the node management table of the node with the first update timing information transmitted from the hub station and for updating, if the update timing information of the node is old, its own node management table based on the modification information.

A wireless network system according to the invention comprises a hub station and a plurality of nodes, wherein the hub station has a hub station management table for managing unique information about each node based on first update timing information, a detection means for detecting a modification in the node configuration, an update means for updating the hub station management table in accordance with the result of detection by the detection means, and a transmitter for transmitting the first update timing information to all of the nodes periodically, wherein each node has a node management table for managing the unique information about the node based on the first update timing information, a receiver for receiving the first update timing information, a data transmission request means for comparing the first update timing information in the node management table of the node with the first update timing information transmitted from the hub station and for requesting, if the update timing information of the node is old, the transmission of the unique information data, and an update means for updating its own node management table based on the unique information data transmitted from the hub station in accordance with the request.

BRIEF DESCRIPTION OF THE DRAWINGS

FIG. 9 shows the details of a node configuration information table owned by the hub station according to the node configuration information management method in the first embodiment.

FIG. 10 shows the details of a node configuration information table owned by a node according to the node configuration information management method in the first embodiment.

FIG. 24 shows the details of a node configuration information table owned by the hub station according to the node configuration information management method in the second embodiment.

FIG. 25 shows the details of a node configuration information table owned by a node according to the node configuration information management method in the second embodiment.

BEST MODES OF CARRYING OUT THE INVENTION

Hereafter, preferred embodiments of the node configuration information management method according to the invention will be described by referring to the attached drawings.

FIRST EMBODIMEMT

Figure 1:
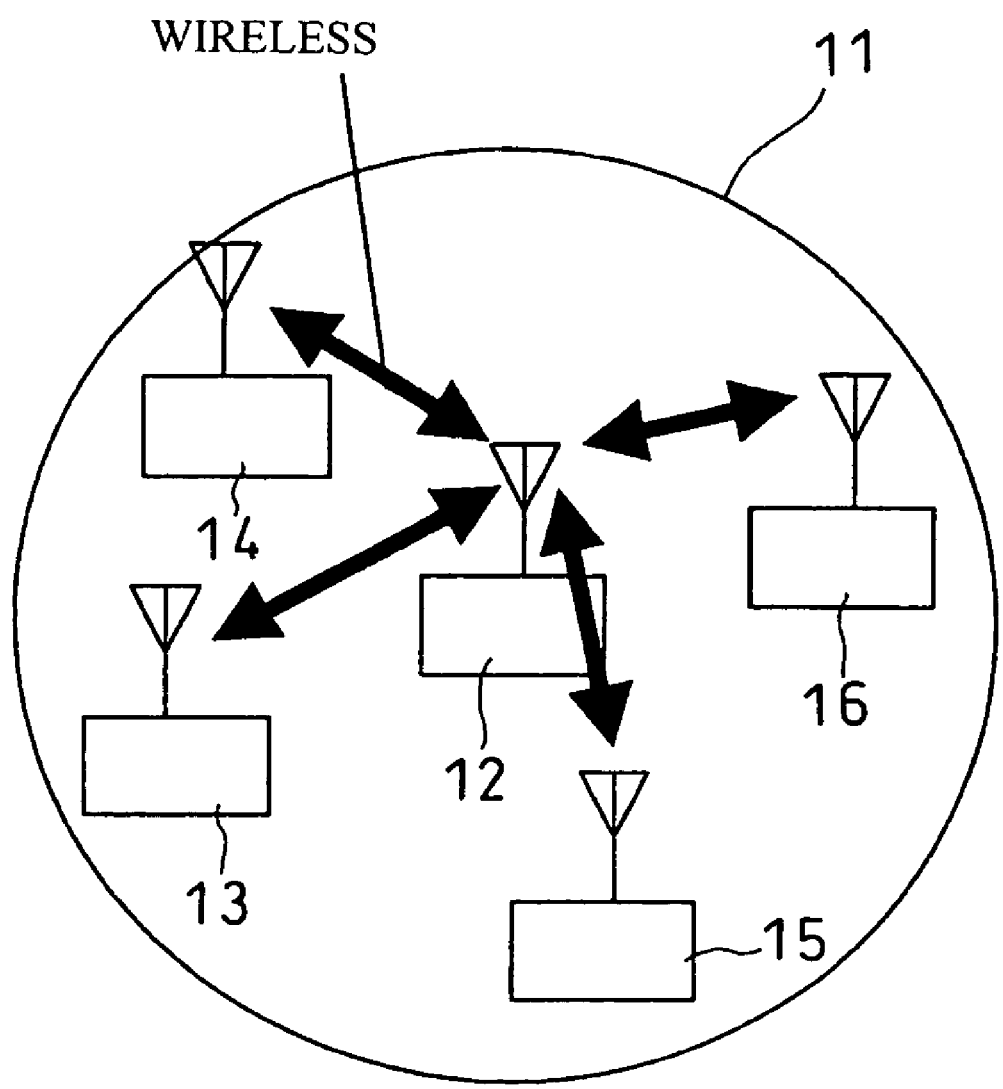
FIG. 1 shows a block diagram of the structure of a wireless bus comprising terminals and a hub station according to the node configuration information management method in the first embodiment of the invention.
Figure 32:
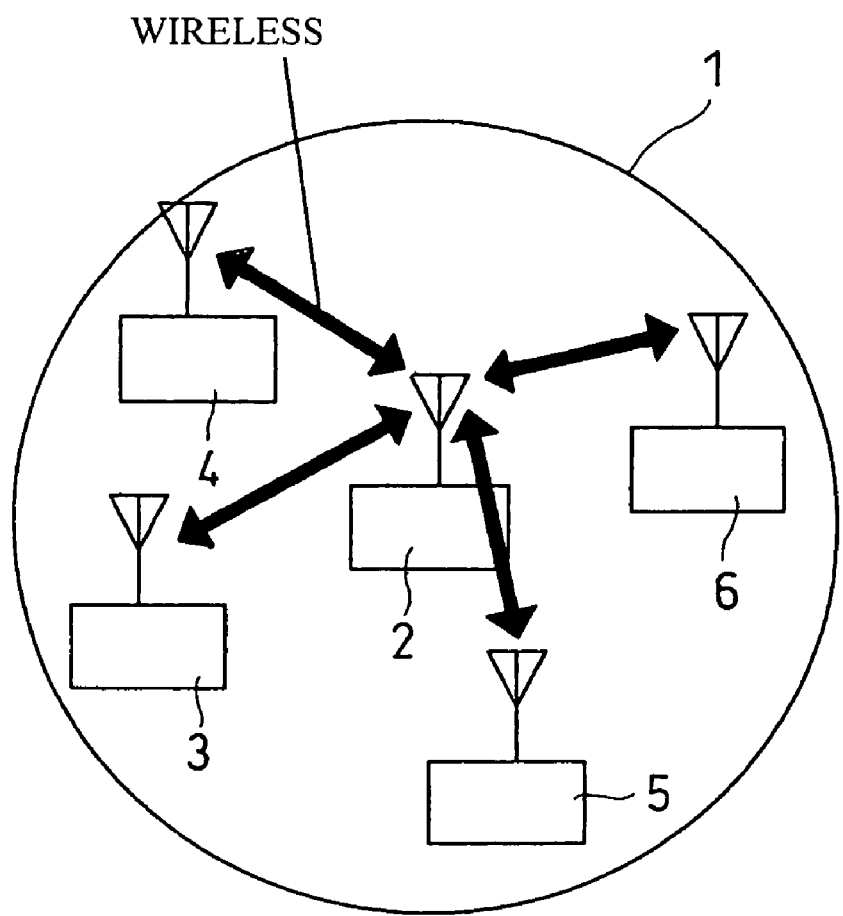
FIG. 32 is a block diagram showing the structure of a wireless bus comprising terminals and a hub station according to a conventional node configuration information management method.

FIG. 1 shows a block diagram of a configuration of terminals and a hub station in a wireless bus according to a first embodiment of the invention. While the configuration is similar to the one shown in FIG. 32, it differs from the prior art example in the frame structure (FIG. 2) used for wireless communication. In FIG. 1, numeral 11 designates a wireless bus (wireless network), numeral 12 designates a hub station, and numerals 13 to 16 designate nodes formed by a plurality of terminals.

A plurality of devices called nodes exist in the wireless bus 11. The nodes transmit or receive multimedia data among them. The transmission and reception of data are managed by the hub station 12, which is selected from among the nodes 13 to 16 in the wireless bus 11 that have the functions required of a hub station. A prerequisite for a node to become the hub station 12 is that the node be located at a position that allows it to communicate with every other node in the wireless bus 1. Further, the hub station 12 is required to be capable of gathering and analyzing the node configuration information, node information for each node, and inter-node communication quality information transmitted from the nodes 13 to 16 in order to manage the latest information. The details of the blocks for the management of the node configuration information in the hub station 12 will be described later by referring to FIG. 7.

The nodes 13 to 16 in the wireless bus 11 have memory regions for storing the node configuration information in the wireless bus 11, the node information for each node, and the inter-node communication quality information, in order to enable the nodes to wirelessly communicate with one another. The details of the blocks for the management of the node configuration information for the nodes 13 to 16 will be described later by referring to FIG. 8.

Figure 2:
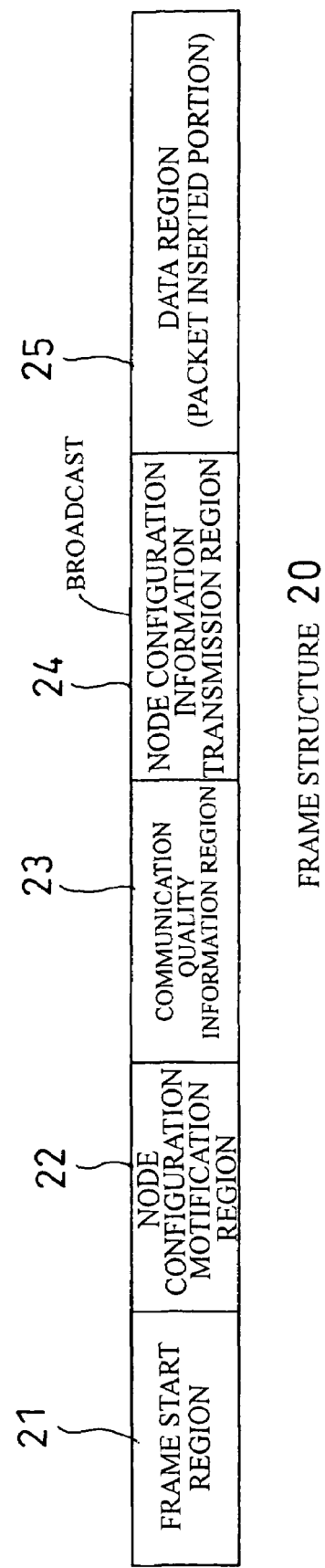
FIG. 2 shows the structure of a frame that is transmitted or received in the wireless bus according to the node configuration information management method in the first embodiment of the invention.

FIG. 2 shows an example of the structure of a frame that is transmitted or received in the wireless bus 11 according to the present embodiment. As shown, a wireless signal with this frame structure 20 is divided into a frame start region 21, a node configuration modification region 22, a communication quality information region 23, a node configuration information transmission region 24, and a data region 25. The hub station 12 signals the start of a frame by using the frame start region 21 in each frame. The hub station 12 transmits a frame start packet.

Figure 3:
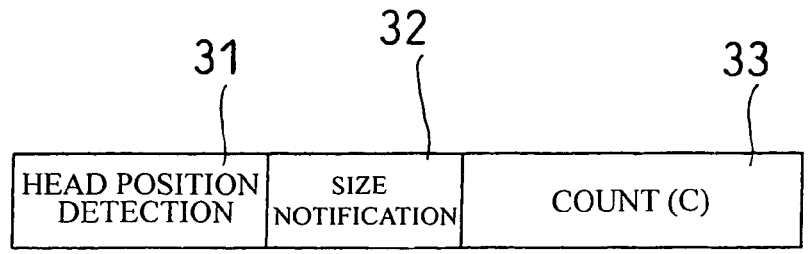
FIG. 3 shows in detail the structure of a frame start packet that the hub station inserts into a frame start region of the frame structure according to the node configuration information management method in the first embodiment of the invention.

FIG. 3 shows the detailed structure of a frame start packet 30 inserted in the frame start region 21 by the hub station 12 in the frame structure of FIG. 2. In FIG. 3, the frame start region 21 has a head position detection region 31 for storing a head position detection signal, a size notification region 32 for storing a size notification signal, and a count (C) region 33 for storing a count (C). The head position detection region 31 is a region that is used for notifying all of the nodes in the wireless bus 11 of the start of a frame. By receiving this head position detection signal, each of the nodes in the wireless bus 11 identifies the start position of a frame. The size notification region 32 is a region that is used for transmitting the size of each of the subsequently transmitted, variable-size regions in the frame. Based on this size notification signal, each node in the wireless bus 11 can identify the subsequent frame configuration. The count (C) region records a count (C) (first update timing information) recorded in the hub station 12. Each node in the wireless bus 11 acquires the count (C) transmitted from the hub station 12 and confirms whether its own node configuration update information is up to date.

Figure 4:
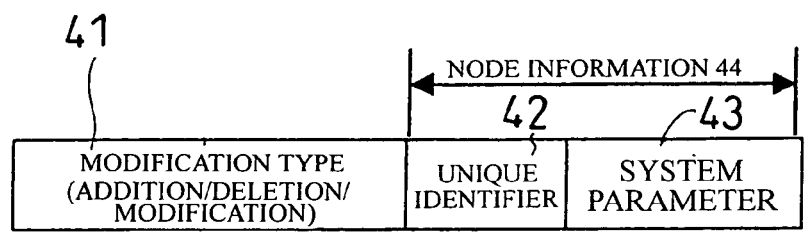
FIG. 4 shows in detail the structure of a node configuration modification notifying packet that a node inserts into a node configuration modification region of the frame structure according to the node configuration information management method in the first embodiment of the invention.

FIG. 4 shows the detailed structure of a node configuration modification notifying packet 40 that is inserted into the node configuration modification region 22 by each node in the frame structure of FIG. 2. The node configuration modification region 22 is a region for transmission by each node in the wireless bus 11 as required. The region is used by a node that is either newly added to or deleted from the wireless bus 11, or modified in terms of its functions in the wireless bus 11, in order to notify the hub station 12.

In FIG. 4, the node configuration modification notifying packet 40 inserted into the node configuration modification region 22 includes a modification type 41 identifying the content of modification in the node configuration information, and node information 44 storing a unique identifier 42 for each node and system parameters 43. The modification type 41 indicates three types of modification in the node configuration information, namely addition, deletion, and modification. The unique identifier 42 in the node information 44 is a number that is registered for each device in advance, and there are no devices having identical numbers. The unique identifier 42 enables the individual devices to be identified. The system parameters 43 store the functions of each node in the wireless bus 11. In the wireless bus 11, the system parameters 43 for each node are acquired from a managed node configuration information table (to be described later by referring to FIGS. 9 and 10) and used as a factor in making decisions during reconfiguration. The hub station 12, upon reception of the node configuration modification notifying packet 40, updates its own node configuration information based on these items of information.

Referring back to FIG. 2, the communication quality information region 23 is a region that is used for recognizing the communication path condition between individual nodes. The communication quality information region 23 includes a region that is used for a synchronization sequence in a wireless bus regarding communication quality information described in a prior art (JP Patent Publication (Unexamined Application) No. 11-215135). The node configuration information transmission region 24 is used by the hub station 12 in transmitting the node configuration information that has been updated in a previous frame to the nodes. The signal that is transmitted here is broadcast. The data region 25 is a region that is used when transmitting a node configuration information request packet 50 (FIG. 5) from each node to the hub station, or when transmitting a node configuration information update packet 60 (FIG. 6) from the hub station to a specific node. It is also used for transmitting multimedia data such as video or voice data.

Figure 5:
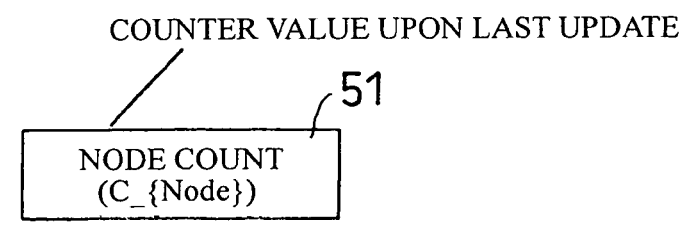
FIG. 5 shows the structure of a node configuration information request packet that a node inserts into a data region in the frame structure according to the node configuration information management method in the first embodiment when the node requests retransmission from the hub station.

FIG. 5 shows the structure of the node configuration information request packet 50 inserted into the data region 25 in the frame structure of FIG. 2 when a node requests retransmission from the hub station 12. The node configuration information request packet 50, which is used by a node that has failed to receive a broadcast signal in requesting retransmission from the hub station, has a node count (C_[Node]) 51. The node count (C_[Node]) 51 indicates a counter value retained by the node that has most recently been updated. By acquiring this node configuration information request packet 50 from the node, the hub station 12 can recognize when was the last time a node configuration information table (to be described later by referring to FIG. 10) carried by the node was updated.

Figure 6:
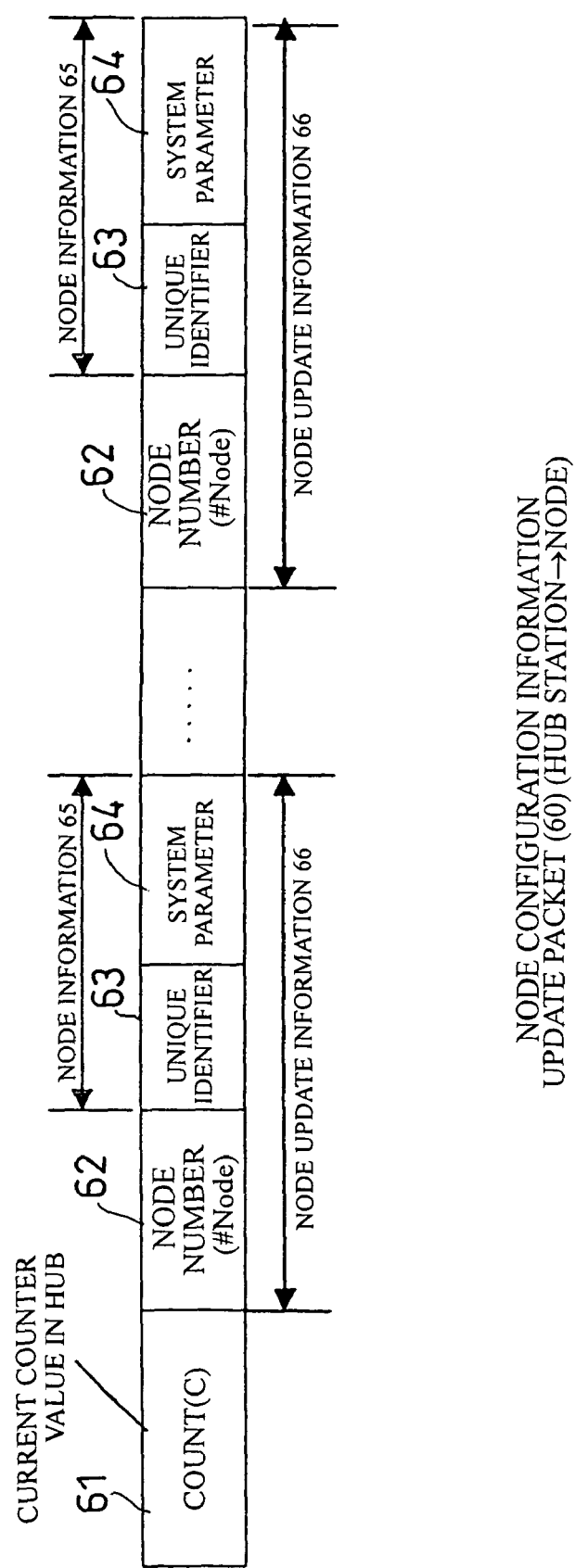
FIG. 6 shows the structure of a node configuration information update packet 60 which the hub station broadcasts using a node configuration information transmission region in the frame structure according to the node configuration information management method in the first embodiment.

FIG. 6 shows the structure of the node configuration information update packet 60 that is broadcast by the hub station 12 using the node configuration information transmission region 24 in the frame structure of FIG. 2. In FIG. 6, the node configuration information update packet 60 has a count (C) 61, a node number (#Node) 62, and node information 65 for storing a unique identifier 63 for each node and system parameters 64. The node number (#Node) 62 and the node information 65 constitute node update information 66, in which a plurality of items of node configuration update information concerning updates in individual nodes are stored.

In the count (C) 61, a first counter value, carried by the hub station 12 when an update occurs, is stored. In the node update information 66, node configuration update information concerning updates in individual nodes is stored. In each item of node configuration update information 66, the node number (#Node) 62 of an updated node and the node information 44, which was described with reference to the node configuration modification notifying packet 40, are stored.

Upon reception of the node configuration information request packet 50, the hub station 12 broadcasts the node configuration information update packet 60 using the data region 25 shown in FIG. 2.

Figure 7:
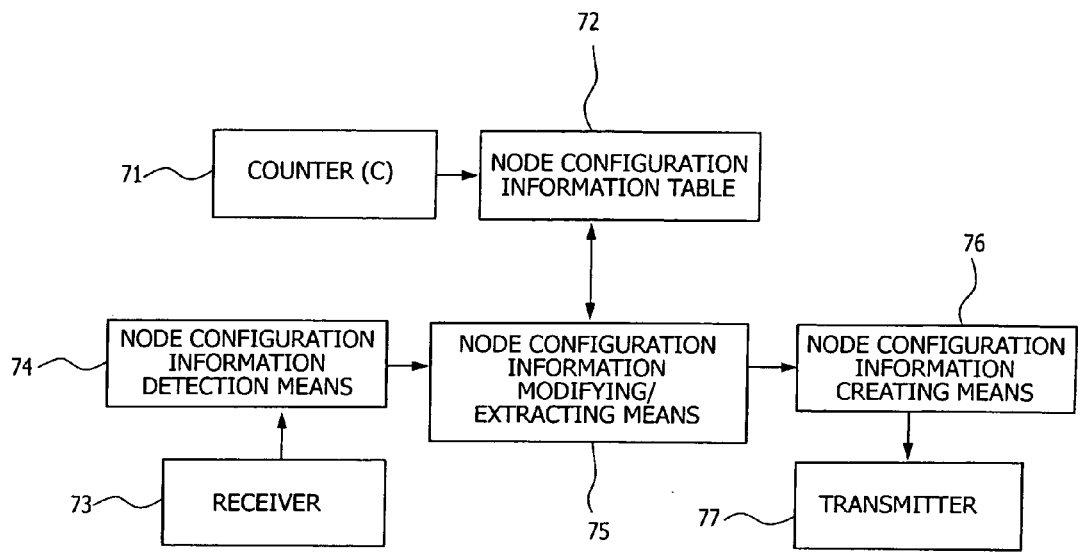
FIG. 7 shows node configuration information management blocks on the part of the hub station according to the node configuration information management method in the first embodiment.

FIG. 7 shows node configuration information management blocks on the part of the hub station for realizing the node configuration management method according to the invention. In FIG. 7, numeral 71 designates a counter (C), numeral 72 a node configuration information table (management table on the part of the hub station), numeral 73 a receiver, numeral 74 a node configuration information detection means, numeral 75 a node configuration information modifying/extracting means, numeral 76 a node configuration information creating means, and 77 a transmitter.

The value in the counter (C) 71 is incremented by one when the node configuration information table as a whole in the hub station 12 has been updated. The node configuration information table 72 is a table for managing the node configuration information in the wireless bus 11. The details of the node configuration information table 72 will be described later with reference to FIG. 9. The node configuration information detection means 74 has a function of detecting the node configuration modification notifying packet 40 in the node configuration modification region and the node configuration information request packet 50 in the data region in the signal frame received by the receiver 73.

If the node configuration information detection means 74 detects a node configuration modifying notification or a request for a retransmission from a node, the node configuration information modifying/extracting means 75 accesses the node configuration information table 72 and modifies or extracts information therein. When the node configuration information detection means 74 detects a retransmission request, the node configuration information modifying/extracting means 75 extracts node configuration information that must be retransmitted. Based on this extracted node configuration information, the node configuration information creating means 76 creates a node configuration information update packet 60. The frame start packet 30 that is required when configuring a frame is also created here. The transmitter 77 has the function of transmitting a transmission signal created by the node configuration information creating means 76. The transmitter 77 has a memory device (queue) for the temporary storage of packets.

Figure 8:
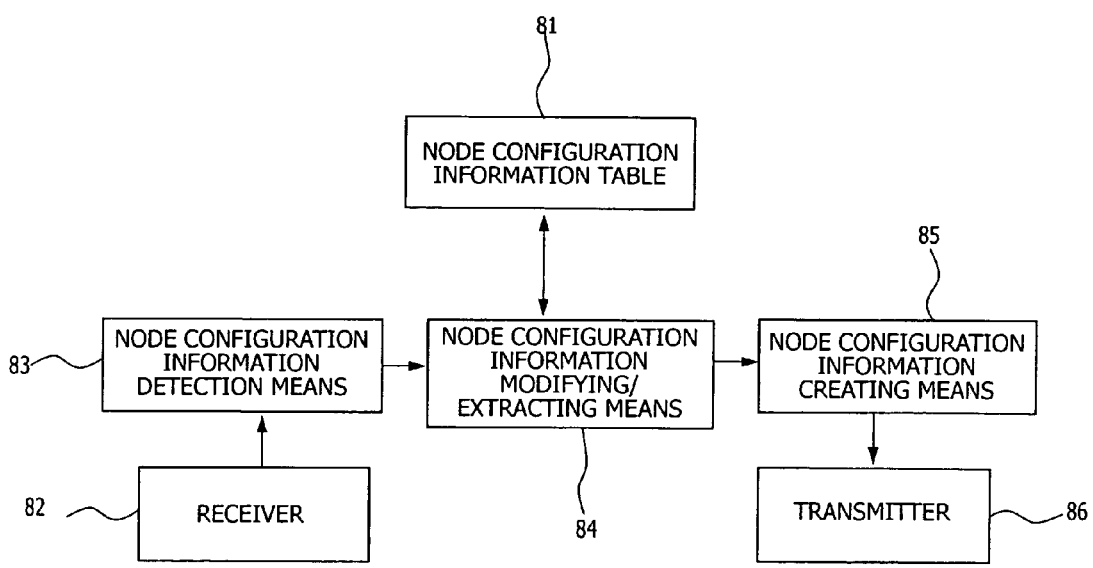
FIG. 8 shows node configuration information management blocks on the part of a node according to the node configuration information management method in the first embodiment.

FIG. 8 shows the blocks for managing node configuration information on the part of a node for realizing the node configuration management method of the invention. In FIG. 8, numeral 81 designates a node configuration information table (management table on the part of a node), 82 a receiver, 83 a node configuration information detecting means, 84 a node configuration information modifying/extracting means, 85 a node configuration information creating means, and 86 a transmitter.

The node configuration information table 81 is a table for managing node configuration information about the wireless bus 11 that is received from the hub station 12. The details of the node configuration information table 81 will be described later by referring to FIG. 10. The node configuration information detection means 83 has the function of detecting the frame start packet 30 in the frame start region and the node configuration information update packet 60 in the data region in the signal frame received by the receiver 82.

When the node configuration information detection means 83 has received the count (C) in the frame start packet 30 or the node configuration information update packet 60, the node configuration information modifying/extracting means 84 accesses the node configuration information table 81 to modify or extract information therein. If it is revealed, as a result of the node configuration information detection means 83 having acquired the count (C), that the information in the table in the particular node is old, the node configuration information creating means 85 creates a node configuration information request packet 50 requesting retransmission of data. The node configuration information creating means 85 also creates a node configuration modification notifying packet 40 notifying the hub station 12 of any modification in node configuration. The transmitter 86 transmits a transmission signal created by the node configuration information creating means 85.

FIG. 9 shows in detail the node configuration information table 72 possessed by the hub station 12. In the figure, the values in <> are examples. As shown, in the node configuration information table 72 of the hub station 12, the current count (C) (first update timing information), a node number (#Node), the count (C_[Hub(#Node)]) for each node number upon updating (second update timing information), and node information for each node number are recorded.

The current count (C) is a first counter (counts: C) for managing the timing of updating the management table as a whole. When the node configuration information or node information is updated, such as when a node is newly registered in or deleted from the wireless bus 11, or when the function of a node is modified, the count value is incremented by one. There are as many node numbers (#Node) prepared as the maximum number of nodes that can be stored in the wireless bus 11. The count upon updating (C_[Hub(#Node)]) is a second counter (counts: C_[Hub]) for managing the timing of updating the node configuration information for each node, and it is associated with a node number (#Node). In this region, the count (C) that is present when the node configuration information or the node information associated with a particular node number has been updated is stored. The node information (unique identifier+ system parameters) is a region in which the hub station 12 secures node information that has been notified via the node configuration modification notification region. Based on this node information, the hub station 12 overwrites the node configuration information table 72.

FIG. 10 shows the details of the node configuration information table 81 possessed by a node. In the figure, values in <> are examples. As shown, in the node configuration information table 81 for each node, the count (C_[Node]) upon updating, node number (#Node), and node information for each node are recorded.

The count (C_[Node]) upon updating is where the current count (C) that a node acquires when it receives the node configuration information update packet 60 from the hub station 12 is stored. Thus, this count (C) indicates when the last update was. The contents of the node number (#Node) and node information are the same as those of the node number (#Node) in the node configuration table 72 on the part of the hub station 12 as described above. The node receives the node configuration information update packet 60 transmitted from the hub station 12 and acquires updated node configuration information, and then overwrites the updated portion.

Figure 11:
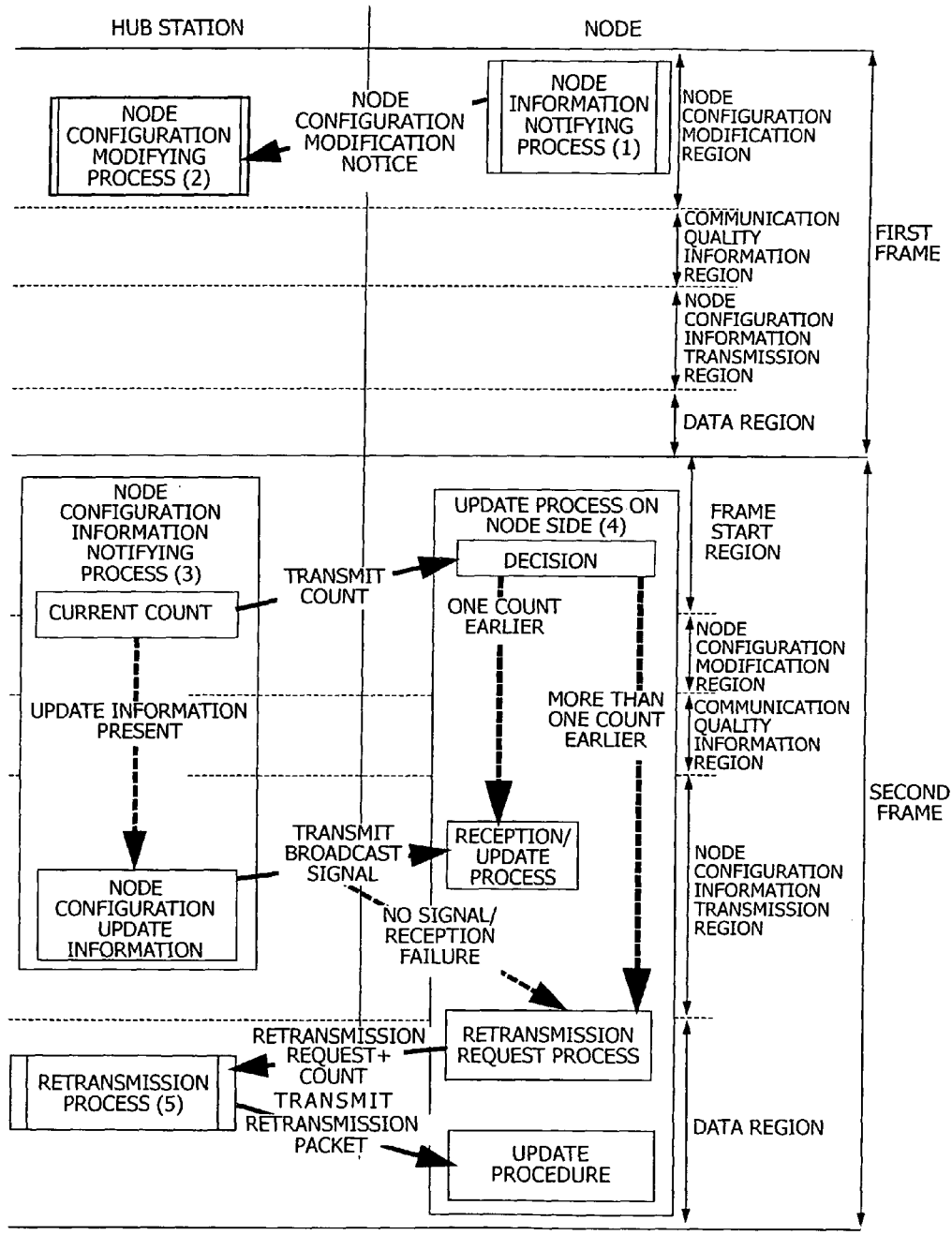
FIG. 11 shows a node configuration information managing sequence starting from when the node configuration is updated to when the updated configuration is transmitted to all of the nodes in the wireless bus according to the node configuration information management method in the first embodiment.

Hereafter, the operation of the above-described method of managing node configuration information will be described in detail. First, the sequence of synchronizing node configuration information in the wireless bus 11 will be described. FIG. 11 shows the node configuration information management sequence starting from the time when the node configuration is updated up to the time when the updated configuration is transmitted to all of the nodes in the wireless bus 11.

<Node Information Notifying Process (1)>

When a node is newly registered in or deleted from the wireless bus 11, or when the system parameters in the wireless bus 11 has been modified, for example, the relevant node initially transmits a node configuration modification notifying packet 40 to the hub station 12 via the node configuration modification region 22. The new registration or deletion of a node from the wireless bus 11, modification of node functions, or modification of the system parameters in the wireless bus 11, for example, are carried out by the node notifying the hub station 12.

<Update Process on the Part of the Hub Station 12 (2)>

Upon reception of the node configuration modification notifying packet 40, the hub station 12 updates the node configuration information table 72 in the hub station 12 based on the received packet 40.

<Node Configuration Information Notifying Process (3)>

In the next frame, the hub station 12 transmits a frame start packet 30 in order to begin a frame start region 21. Each node in the wireless bus 11 receives the frame start packet 30 and identifies the head position of the frame. If node configuration update information exists, the hub station broadcasts a node configuration information update packet 60 to all of the nodes in a node configuration information transmission region 24.

<Update Process on the Part of a Node (4)>

Each node acquires the count (C) transmitted from the hub station 12 in the frame start region 21, compares it with the count (C_[Node]) in its own table (node configuration information table 81), and makes a decision in the following process.

If the count (C_[Node]) of its own corresponds to the acquired count (C), the node determines that its own node configuration information table 81 is the latest node configuration information, and the process comes to an end. If the count (C_[Node]) of its own is one count earlier than the acquired count (C), the node determines that the node configuration information has been updated in the hub station 12. Then, the node acquires a node configuration information update packet 60 that should be transmitted from the hub station 12 in the subsequent node configuration information transmission region 24. Based on that packet, the node overwrites its own node configuration information table 81.

If the node configuration information update packet 60 is not received, or if the comparison of counts shows that count (C_[Node]) in the node is two or more counts earlier than the acquired count (C), the node makes a retransmission request to the hub station 12 in the data region. Based on the retransmitted packet, the node updates the node configuration information table 81.

<Retransmission Process (5)>

This retransmission process indicates the sequence of a node requesting the hub station 12 for retransmission in case the node failed to receive the node configuration information update packet 60 that was broadcast. The hub station 12 receives a node configuration information request packet 50 from the particular node and acquires the counter value in the node, and makes a decision as to up to which point of the node configuration information should be transmitted. Then, the hub station 12 transmits the information to the requesting node in a node configuration information update packet 60.

Hereafter, the individual process steps 1 to 5 illustrated in FIG. 11 will be described by referring to a flowchart.

<Sequence of the Node Information Modification Notifying Process (1) Carried Out on the Part of a Node>

Figure 12:
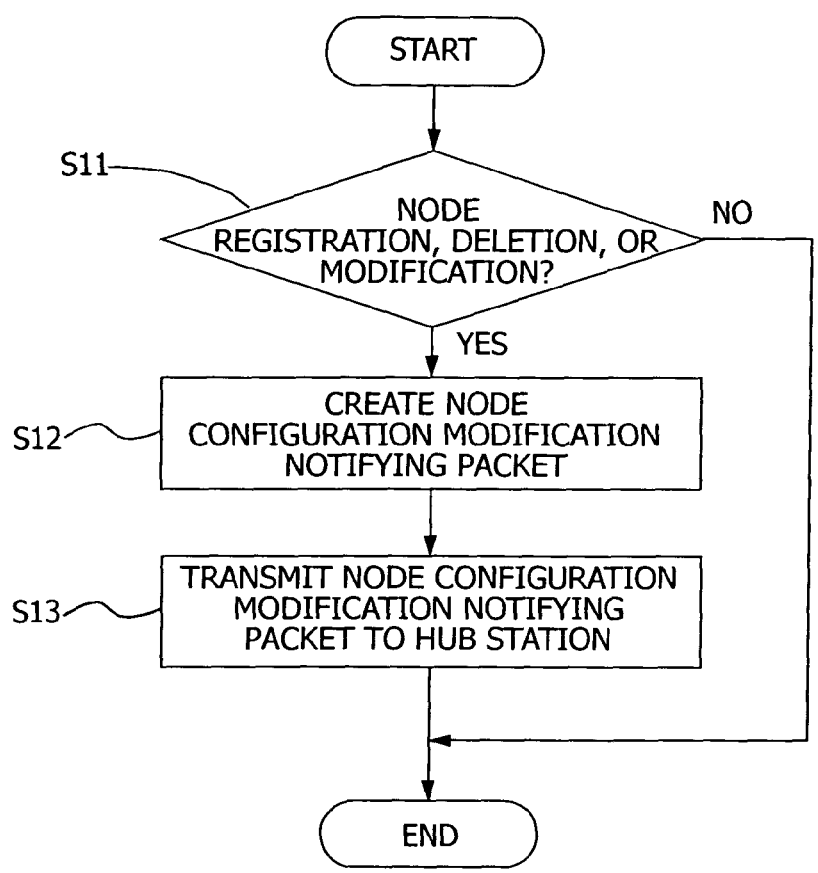
FIG. 12 shows a flowchart of the sequence of a node information notifying process (1) on the part of a node according to the node configuration information management method in the first embodiment.

FIG. 12 shows a flowchart of the sequence of the node information notification process (1) carried out on the part of a node in the node configuration information management sequence of FIG. 11. In the figure, S indicates each step of the flow.

In step S11, the node makes a decision as to whether there is new registration in the wireless bus 11, deletion from the wireless bus 11, or modification in the node's system parameters in the wireless bus 11. If there is no modification, the sequence comes to an end. If there is a modification, a node configuration modification notifying packet 40 is prepared in which the type of modification (addition, deletion, or modification) and node information are inserted in accordance with the format of the node configuration modification notifying packet 40 (see FIG. 4) in step S12. The node transmits the thus prepared node configuration modification notifying packet 40 to the hub station 12 in step S13, and the process comes to an end.

<Sequence of the Node Configuration Updating Process (2) Carried Out on the Part of the Hub Station 12>

Figure 13:
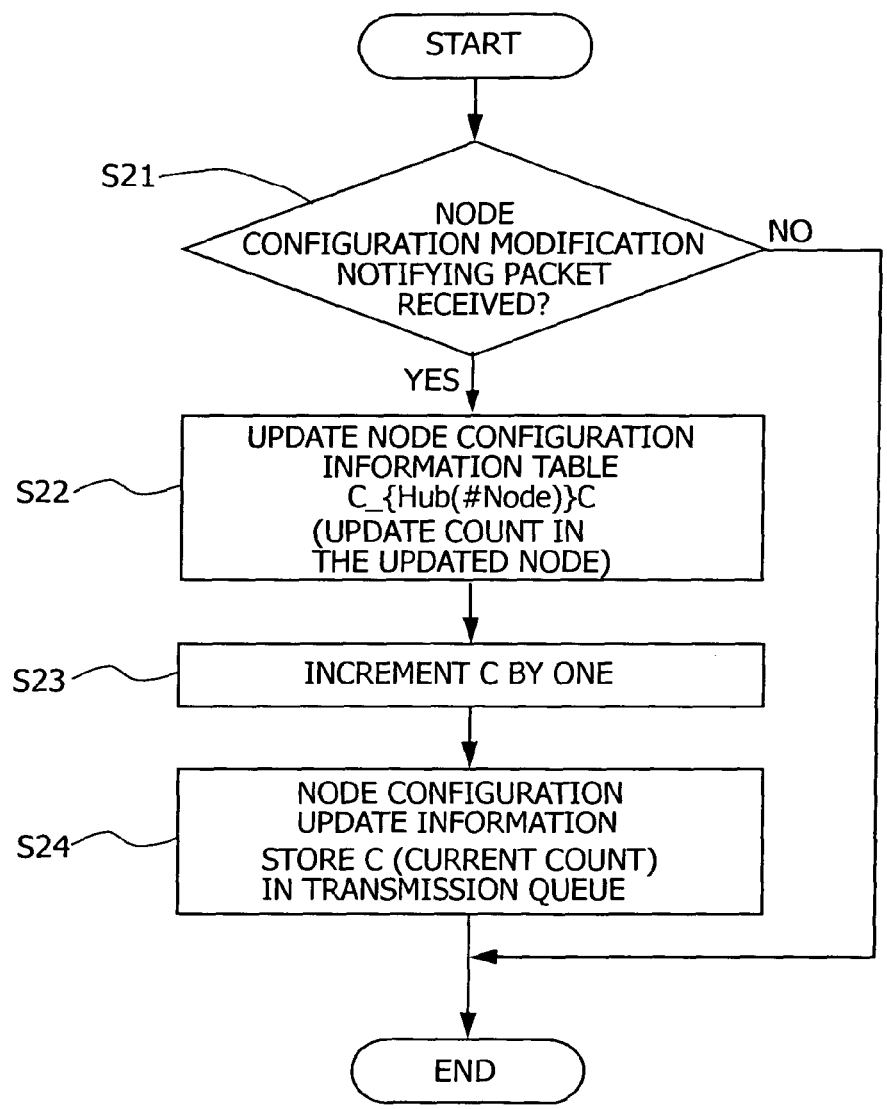
FIG. 13 shows a flowchart of the sequence of a node configuration update process (2) on the part of the hub station according to the node configuration information management method in the first embodiment.

FIG. 13 shows a flowchart of the node configuration updating process (2) sequence carried out on the part of the hub station 12 in the node configuration information management sequence of FIG. 11.

In step S21, the hub station 12 determines whether or not it has received the node configuration modification notifying packet 40. If not, the process comes to an end. If the hub station 12 has received the node configuration modification notifying packet 40, the hub station 12 updates its own node configuration information table 72 in step S22 and overwrites the current count (C) on the count (C_[Hub(#Node)]) where updated. Then, in step S23, the count (C) is incremented by one, a node configuration information update packet 60 is stored in a transmission queue in step S24 for transmission in the node update information transmission region of the subsequent frame, and then the process comes to an end.

<Sequence of Frame Start Region 21 Process (3) on the Part of the Hub Station 12>

Figure 14:
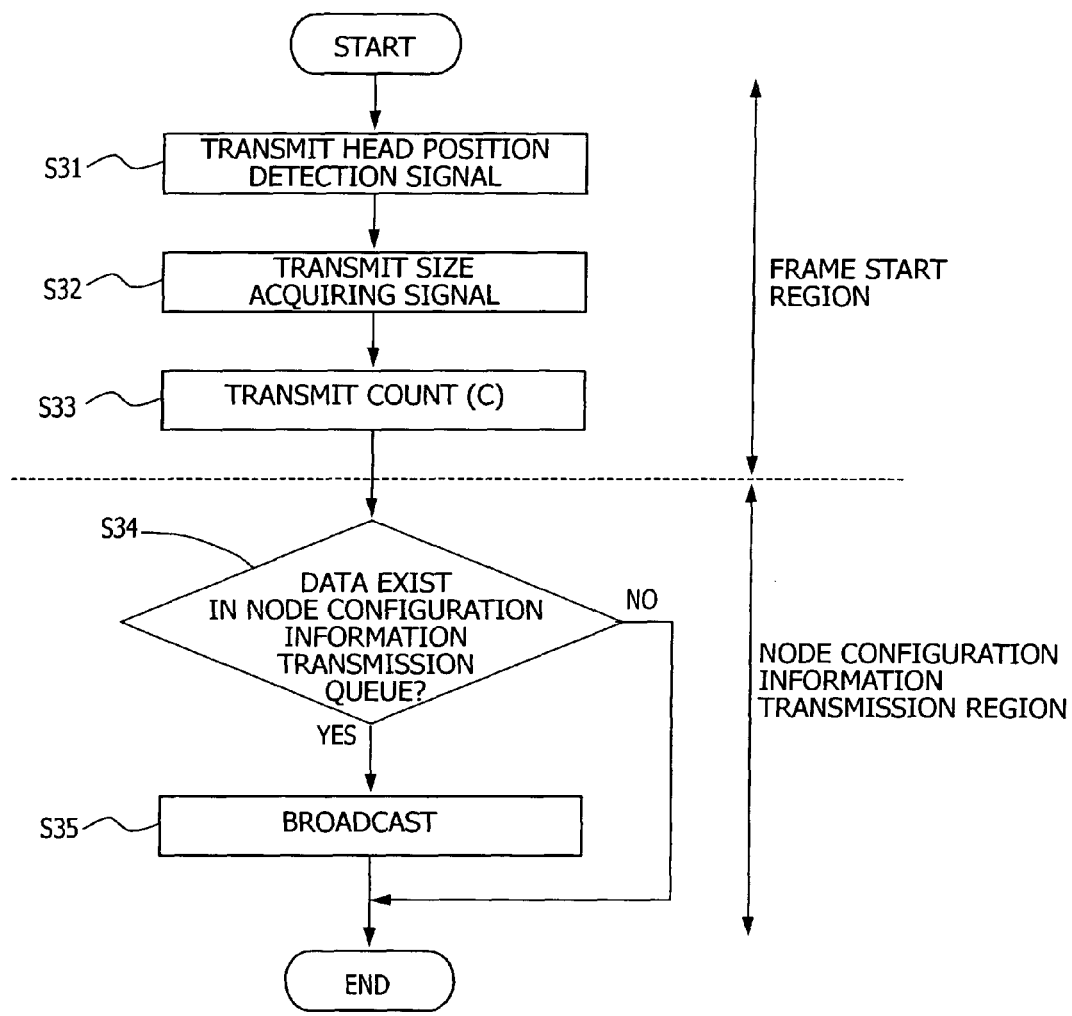
FIG. 14 shows a flowchart of the sequence of a frame start region process (3) on the part of the hub station according to the node configuration information management method in the first embodiment.

FIG. 14 shows a flowchart of the sequence of the frame start region 21 process (3) carried out on the part of the hub station 12 in the node configuration information management sequence of FIG. 11.

In step S31, the hub station 12 transmits a head position detection signal. By receiving this signal, each node in the wireless bus 11 identifies the head position of the frame. In step S32, the hub station 12 transmits a size notifying signal. By receiving this signal, each node in the wireless bus 11 identifies the subsequent frame configuration. Then, in step S33, the hub station 12 transmits a count (C). The processes up to this point are carried out in the frame start region.

Then, the sequence enters the node configuration information transmission region, and in step S34, it is determined whether or not data exists in the node configuration information transmission queue. If data exists in the transmission queue, the hub station 12 broadcasts the node configuration information update packet 60 to all of the nodes in step S35, and the process comes to an end. If there is no data in the transmission queue, the process comes to an end at that point.

<Sequence of the Node Configuration Information Updating Process (4) on the Part of a Node>

Figure 15:
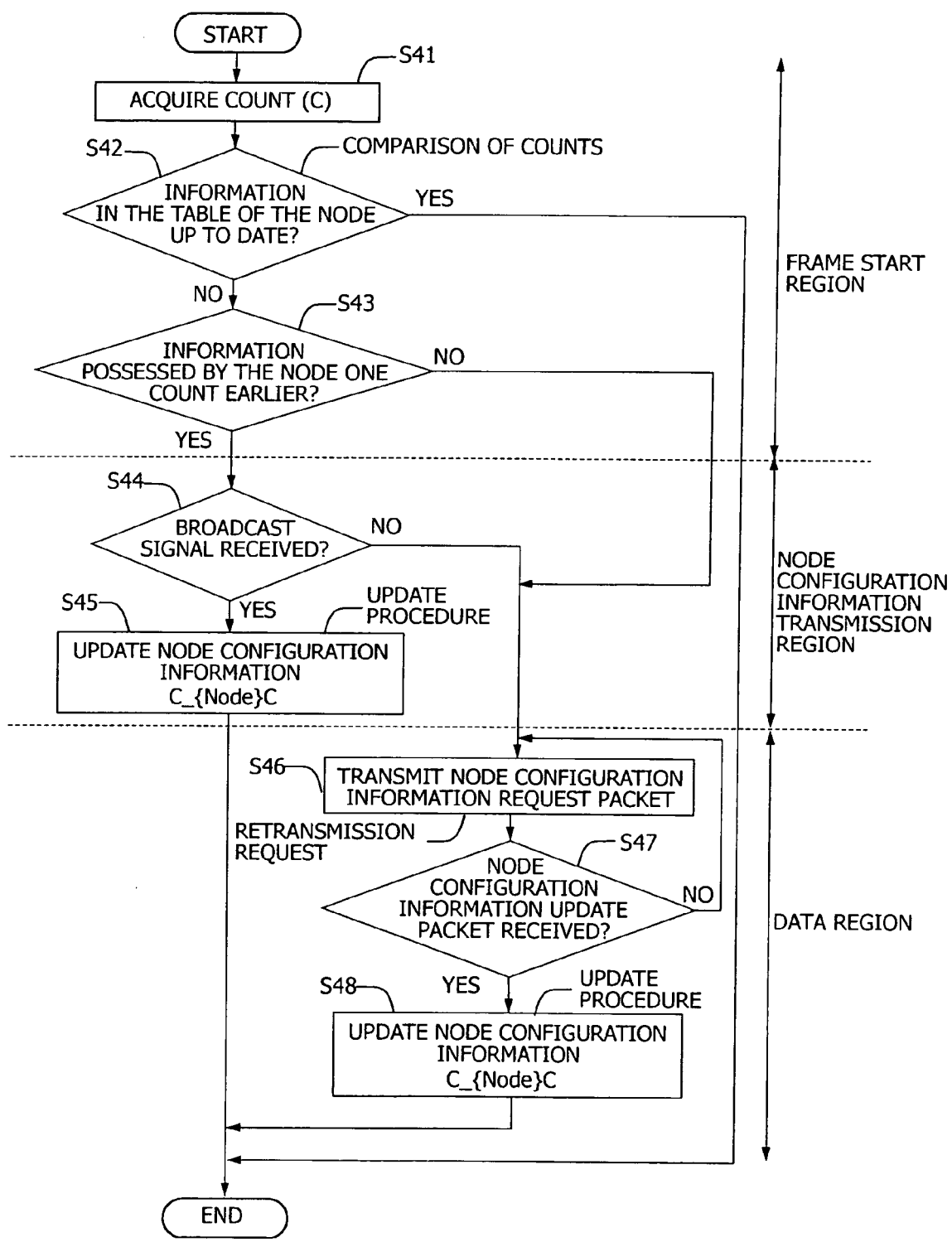
FIG. 15 shows a flowchart of the sequence of a node configuration information update process (4) on the part of a node according to the node configuration information management method in the first embodiment.

FIG. 15 shows a flowchart of the sequence of the node configuration information updating process (4) carried out on the part of a node in the node configuration information management sequence of FIG. 11.

In step S41, a node acquires the count (C) transmitted from the hub station 12 in the frame start region 21. In step S42, the node compares the count with its own count (C_[Node]). If the counts correspond, the node determines that its own node configuration information table 81 is the latest one, and the sequence comes to an end.

If the counts do not correspond, the node determines whether or not its own count (C_[Node]) is one count earlier than the acquired count in step S43. If its own count (C_[Node]) is one count earlier than the acquired count, the node determines that the node configuration information has been updated on the part of the hub station 12, and it then determines in step S44 whether a broadcast signal has been received in the subsequent node configuration information control region. If it is determined in step S43 that the count (C_[Node]) of the node is not one count earlier than the acquired count, the sequence proceeds to step S46. The processes up to this point are carried out in the frame start region.

If the broadcast signal is received in step S44, the node acquires a node configuration information update packet 60 in step S45 and updates its own table (node configuration information table 81) based on this information, and the sequence comes to an end. This process is carried out in the node configuration information transmission region.

If the count of the node (C_[Node]) is two or more counts earlier than the acquired count ("NO" in step S43), or if the broadcast signal is not received, the node makes a node configuration information retransmission request in the data region in step S46. Then, in step S47, the node determines whether or not the node configuration information update packet 60 has been received. If not, the sequence returns to step S46 to repeat the retransmission request.

Upon reception of the node configuration information update packet 60 from the hub station 12, the node updates its own node configuration information table 81 based on the node configuration information update packet 60 in step S48, overwrites its own count (C_[Node]) with the current count (C), and then the process comes to an end.

<Retransmission Process (5) Sequence on the Part of the Hub Station 12>

Figure 16:
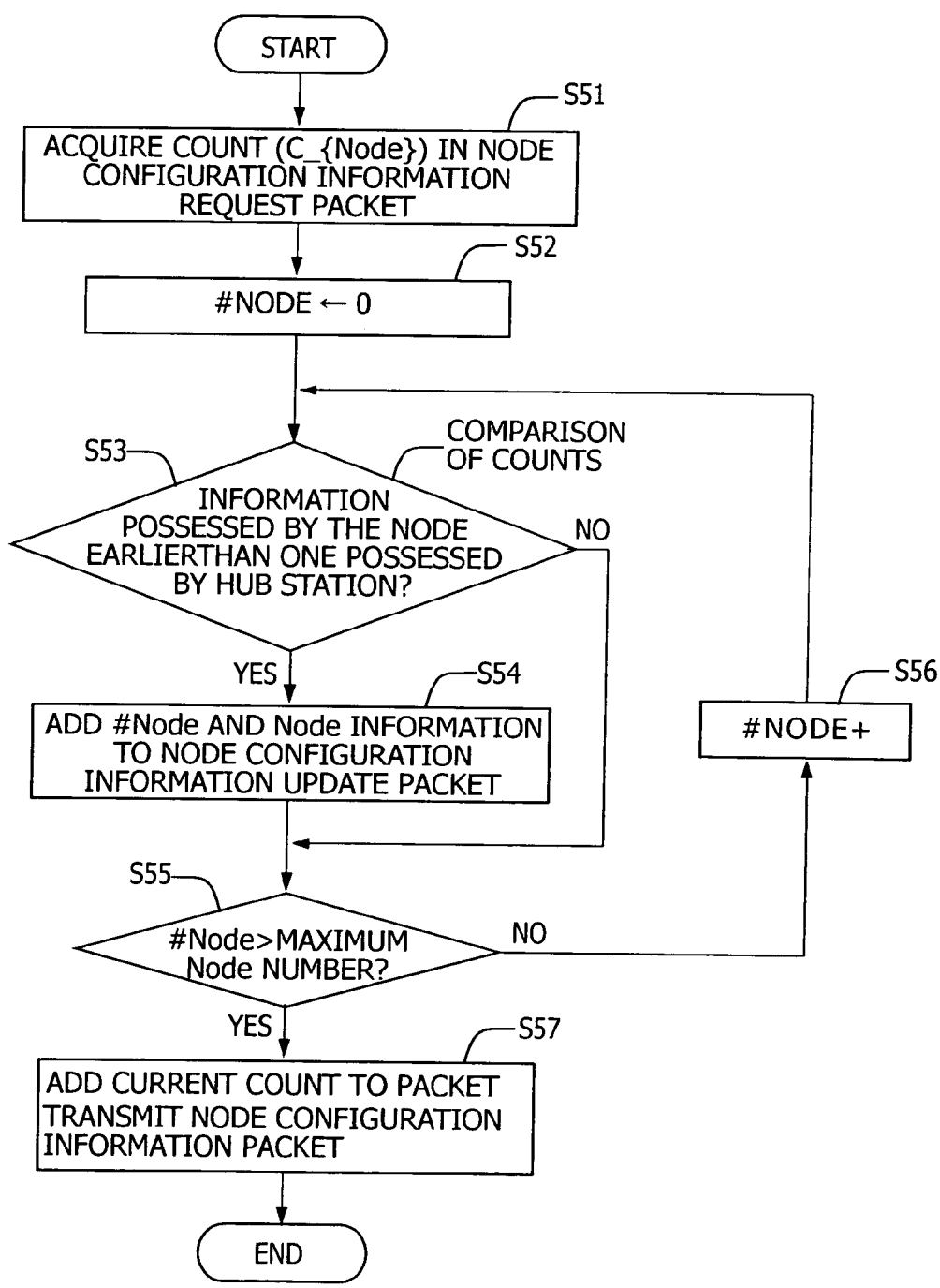
FIG. 16 shows a flowchart of the sequence of a retransmission process (5) on the part of the hub station according to the node configuration information management method in the first embodiment.

FIG. 16 shows a flowchart of the sequence of the retransmission process (5) carried out on the part of the hub station 12 in the node configuration information management sequence of FIG. 11.

In step S51, the hub station 12, having received the node configuration information request packet 50 in step S51, acquires the count (C_[Node]) from the packet and makes the node number (#Node) zero in step S52. Then, in step S53, the hub station 12 compares the acquired count (C_[Node]) with the count (C_[Hub(#Node)]) stored in the node configuration information table 72 stored in the hub station 12 on a node-by-node basis. Based on this comparison of counts, it is determined whether the information possessed by the node is older than that possessed by the hub station 12.

If the acquired count (C_[Node]) is older than the count (C_[Node]) in the table of the hub station 12, the hub station 12, deciding that it must transmit the node information concerning the node, inserts the node number (#Node) and node information into the node configuration information update packet 60 in step 54. In step S55, it is determined whether the node number (#Node) has exceeded the maximum node number. If not, the node number (#Node) is incremented for the next node (#Node++) in step S56 for carrying out a retransmission process for the next node, and the sequence returns to step S53, where the above operation is performed for all of the nodes. When the node number (#Node) has exceeded the maximum node number, it is determined that the operation has been completed for all of the registered nodes. Then, the current count (C) is added to the packet and the node configuration information packet is transmitted in the final step S57, thus ending the process.

In order to ensure the completeness of the data or to simplify it, all of the node configuration information currently possessed by the hub station may be transmitted without carrying out the above sequence.

In sequences (1) to (5), if the various packets cannot be transmitted in the same frame, such as when the node configuration information size is large, the transmission may start after waiting for the beginning of the relevant region in the next frame.

As described above, in accordance with the node configuration information management method according to the first embodiment, the frame structure 20 has the frame start region 21, node configuration modification region 22, communication quality information region 23, node configuration information transmission region 24, and data region 25. When a change (new registration or deletion of a node, or modification of the node functions) occurs in the node information in the wireless bus 11, the node notifies the hub station 12 of the modification by means of the modification notifying packet. Thus, there is no need to notify the hub station 12 of node configuration information in each frame, enabling communication without redundancy.

According to the present node configuration information management method, basically:

(1) The nodes 13 to 16 and the hub station 12 store the node configuration information for each node in the node configuration information tables 72 and 81, and the hub station 12 has the counter (C) 71 for managing the updating of the node configuration information table 72 as a whole, and transmits the count (C) (first update timing information) periodically (in each frame in the embodiment);

(2) The hub station 12, upon reception of a notification of change in the node configuration from a node, updates the node configuration information table 81 in the hub station 12, and broadcasts the update information to all of the nodes in the wireless bus 11; and (3) Each node receives the update information from the hub station 12 and updates its own node configuration information table 81. The node further receives the count that is transmitted in each frame and determines whether or not there is any updating on the part of the hub station 12. If necessary, the node requests the retransmission of differential information with respect to its own node configuration information table 81, and updates its own node configuration information table 81.

Particularly, the hub station 12 has a first counter (count: C) for managing the update timing for the node configuration information table 72 as a whole and, further, a second counter (count: C_[Hub]) for managing the update timing for the node configuration information for each node.

The hub station 12 transmits the current count (C) to all of the nodes in the wireless bus 11 in each frame, thus notifying them of the current update situation. Each of the nodes has a region (C_[Node]) for storing the first count (C), acquires the first count (C) transmitted from the hub station 12 in each frame, and determines whether or not the node is synchronized with the hub station 12. Thus, the hub station 12 can transmit only a portion of the information in the node configuration information tables 72 and 81 that has been modified in the node, reducing the amount of data transmitted.

Further, the hub station 12 broadcasts the node configuration update information, so that there is no need for the hub station 12 to wait for an Ack from the nodes. Even if a node has failed to receive the node configuration update information, the node can detect the failure by acquiring the count (C) in the subsequent frame. By requesting the retransmission of the node configuration information from the hub station 12 on a node-by-node basis, synchronization between the node and the hub station can be maintained.

According to the present embodiment, the hub station transmits only a necessary portion of the node configuration information to each of the nodes in the wireless bus 11, so that the node configuration information can be synchronized between the hub station 12 and the nodes efficiently and reliably.

The node configuration information management method according to the first embodiment requires at least two frames before the node configuration information table 81 in each of the nodes in the wireless bus can be updated following the notification of node configuration modification. It is possible that some of the data that is transmitted during that time becomes invalid. Further, as the decision as to whether or not the node configuration information tables in the wireless bus 11 have been updated is made by individual nodes, the hub station 12 cannot recognize the update situation on the part of the nodes. In the following, a second embodiment that can solve these problems will be described.

SECOND EMBODIMEMT

The configuration of the terminals and the hub station in a wireless bus according to this embodiment is similar to that shown in FIG. 1.

Figure 17:
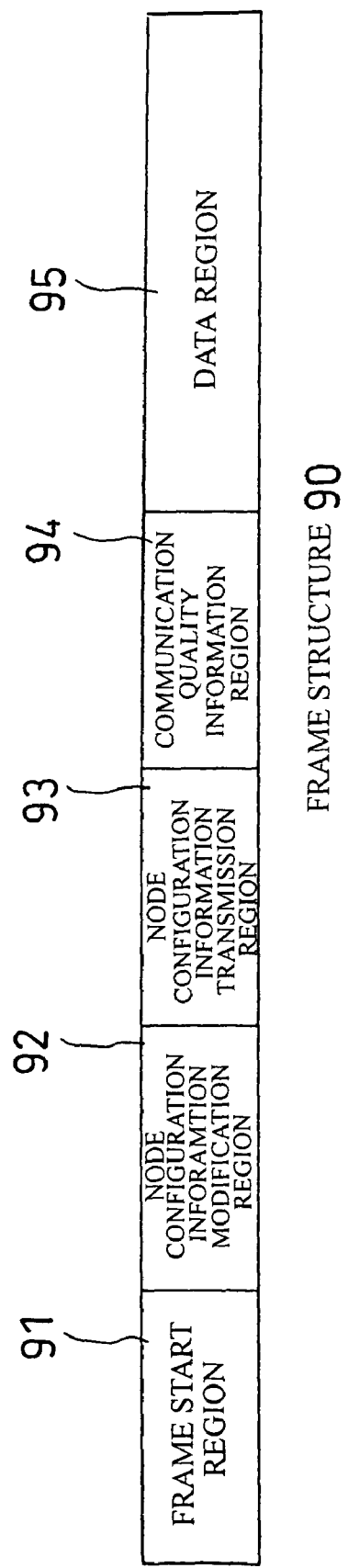
FIG. 17 shows the structure of a frame that is transmitted or received in a wireless bus according to a second embodiment of the invention.

FIG. 17 shows the structure of a frame that is transmitted and received in the wireless bus according to the second embodiment, the frame structure corresponding to FIG. 2.

As shown in FIG. 17, a wireless signal with a frame structure 90 is divided into a frame start region 91, a node configuration information modification region 92, a node configuration information transmission region 93, a communication quality information region 94, and a data region 95. The hub station 12 indicates the start of a frame by using the start region 91 in each frame.

Figure 18:
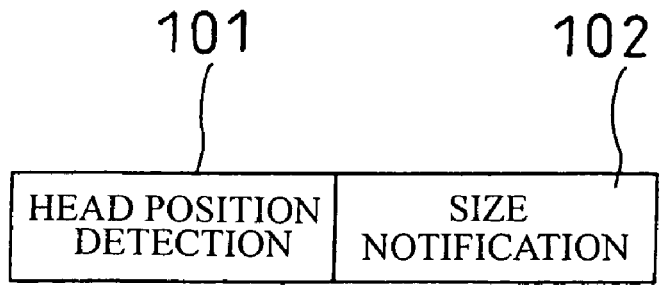
FIG. 18 shows in detail the structure of a frame start packet that the hub station inserts into a frame start region of the frame structure according to the node configuration information management method in the second embodiment of the invention.

FIG. 18 shows a frame start packet 100 in detail, which the hub station 12 inserts into the frame start region 91 in the frame structure of FIG. 17. In FIG. 18, the frame start region 91 has a head position detection region 101 for storing a head position detection signal, and a size notifying region 102 for storing a size notifying signal. The head position detection region 101 is used for notifying each node in the wireless bus 11 of the start of a frame. Each node in the wireless bus 11 identifies the frame start position by receiving this head position detecting signal. The size notifying region 102 is used for transmitting the size of each of the variable-size regions in the frame that are subsequently transmitted. Based on this size notifying signal, each node in the wireless bus can identify the subsequent frame structure.

Figure 19:
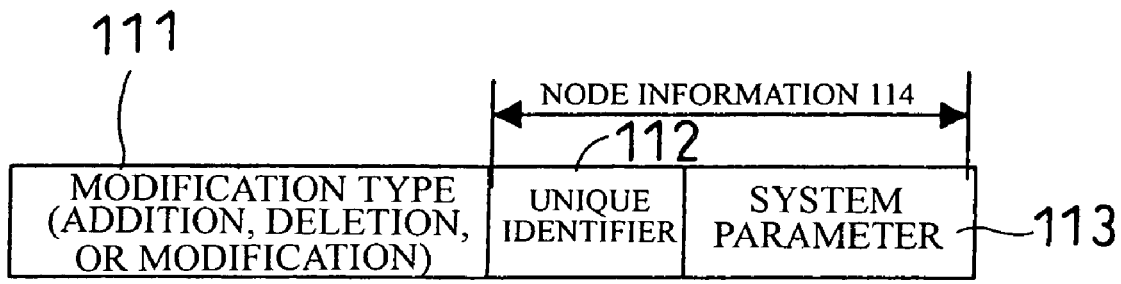
FIG. 19 shows in detail the structure of a node configuration packet that a node inserts into a node configuration information modification region of the frame structure according to the node configuration information management method in the second embodiment of the invention.

FIG. 19 shows the structure of a node configuration modification notifying packet 110 in detail, which a node inserts into the node configuration information modification region 92 in the frame structure of FIG. 17. The node configuration information modification region 92 is used for transmission by each node in the wireless bus 11 as necessary. When a node is newly added to the wireless bus 11, when a node is deleted from the wireless bus 11, or when the function of a node in the wireless bus 11 is modified, the relevant node notifies the hub station 12 of the modification using the node configuration information modification region 92.

In FIG. 19, the node configuration modification notifying packet 110 inserted into the node configuration information modification region 92 includes a modification type 111 for identifying the content of the modification in the node configuration information, and a node information 114 for storing a unique identifier 112 and system parameters 113 for each node. The modification type 111 enables the identification of three kinds of modification, namely addition, deletion, and modification in the node configuration information.

The unique identifier 112 is a number that is registered for each device in advance. No devices have identical numbers. The unique identifier 112 enables the individual devices to be identified. The system parameters 113 stores the function of each node in the wireless bus 11. The wireless bus 11 acquires the system parameters 113 of each node on the basis of a managed node configuration information table (to be described later by referring to FIGS. 24 and 25) and uses it as a factor in making decisions during reconfiguration.

The hub station 12, upon reception of the node configuration modification notifying packet 110, updates its own node configuration information based on these items of information.

Figure 20:
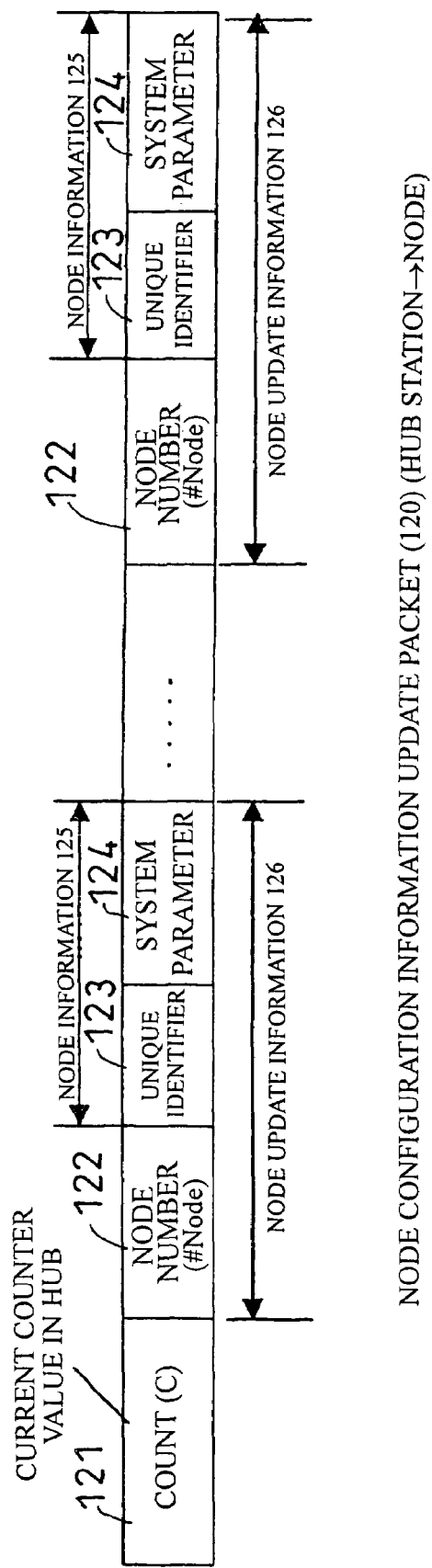
FIG. 20 shows the structure of a node configuration information update packet that the hub station inserts into a data region of the frame structure according to the node configuration information management method in the second embodiment of the invention when retransmitting to a node.

FIG. 20 shows the structure of a node configuration information update packet 120 that is inserted into the data region 95 in the frame structure of FIG. 17 when the hub station 12 re-transmits to a node. In FIG. 20, the node configuration information update packet 120 includes a count (C) 121, a node number (#Node) 122, and node information 125. The node information 125 stores a unique identifier 123 for each node and system parameters 124. The node number (#Node) 122 and the node information 125 constitute node update information 126, in which a plurality of items of node configuration update information updated in the individual nodes are stored.

In the count (C) 121, the value in the first counter possessed by the hub station 12 upon updating is stored. In the node update information 126, the node configuration update information updated in each node is stored. In each item of node configuration update information 126, the node number (#Node) 122 of an updated node and the node information 114 described with reference to the node configuration modification notifying packet 110 are stored. The node configuration information update packet 120 is used by the hub station 12 when it retransmits in response to the node configuration information request packet (FIG. 5).

Referring back to FIG. 17, the node configuration information transmission region 93 is a region used by the hub station 12 in transmitting the node configuration information updated in a previous frame to a node. The signal transmitted here is broadcast. This broadcast node configuration information update packet has the same structure as that of the node configuration information update packet 120. The communication quality information region 94 is used for recognizing the communication path conditions between the individual nodes.

Figure 21:
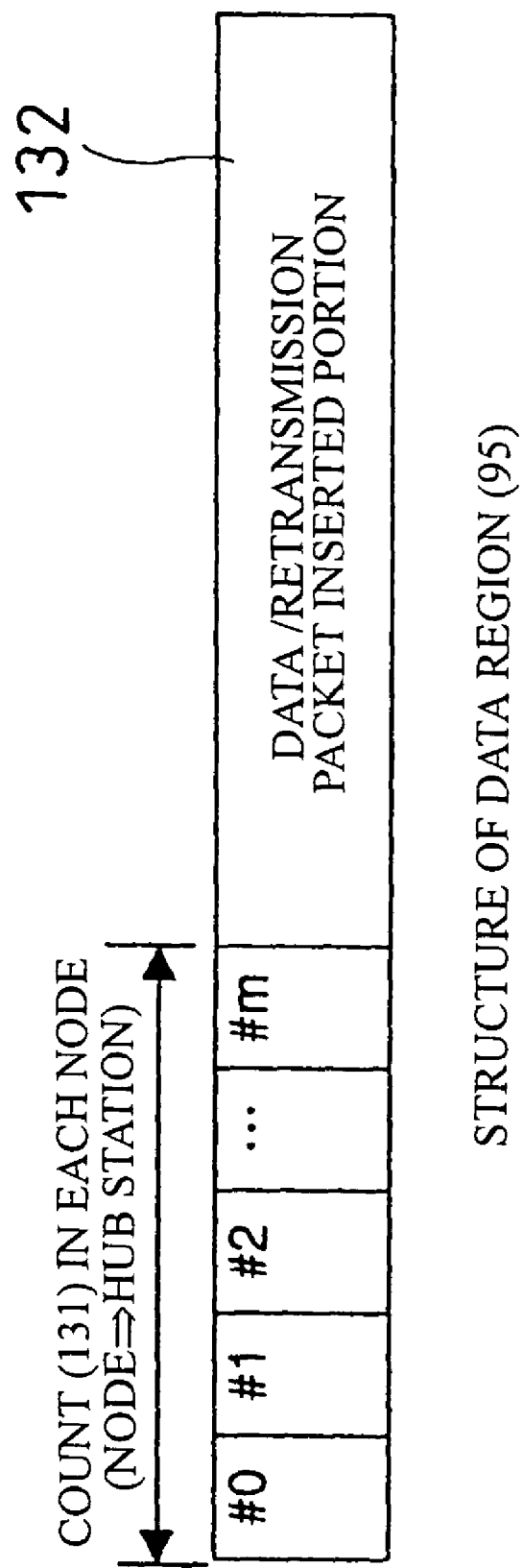
FIG. 21 shows the structure of a data region in the frame according to the node configuration information management method in the second embodiment.

FIG. 21 shows the structure of the data region 95 in the frame shown in FIG. 17. In FIG. 21, the data region 95 includes a count (C_[Node]) transmission region 131 for each node in the wireless bus 11, and a data region 132 including the operation of the transmission of the node configuration information update packet 120 for a node that is not synchronized and for the transmission and reception of normal data.

The count transmission region 131 is used for confirming whether or not each node in the wireless bus 11 is synchronized with the node configuration information table in the hub station 12. For each wireless frame, each node reports its own current count (C_[Node]) to the hub station 12. The hub station 12 acquires the count (C_[Node]) and then updates its own node configuration information table. By comparing the count (C_[Node]) of each node with the current count (C), the hub station 12 confirms the update situations concerning all of the nodes and determines whether or not the nodes in the wireless bus 11 are synchronized. The data region 132 is a region that is used by the hub station 12 in transmitting the node configuration information update packet 120, as well as multimedia data such as video or voice data, to a particular node.

Figure 22:
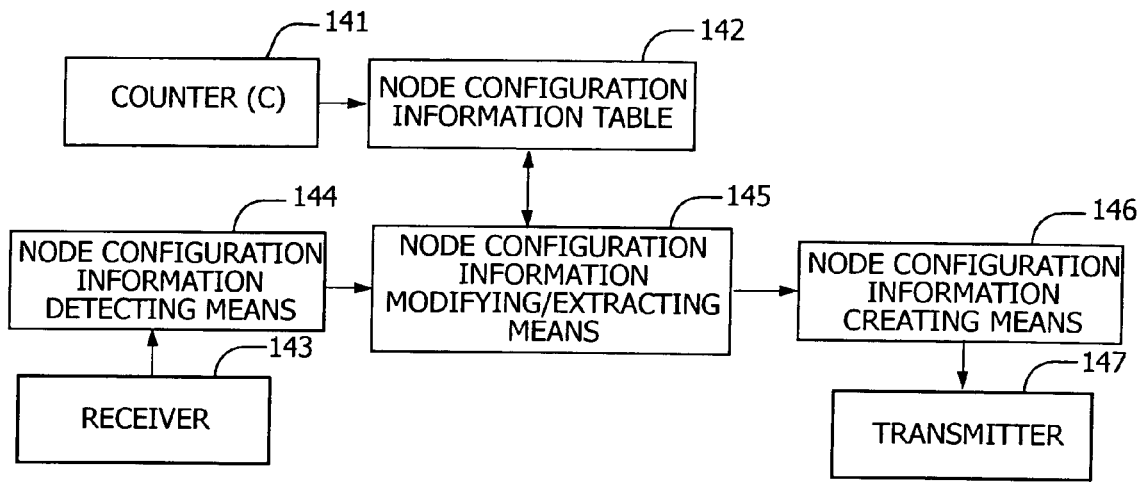
FIG. 22 shows node configuration information managing blocks on the part of the hub station according to the node configuration information management method in the second embodiment.

FIG. 22 shows node configuration information management blocks on the part of the hub station for realizing the node configuration management method according to the present embodiment, the figure corresponding to FIG. 7. In FIG. 22, numeral 141 designates a counter (C), 142 a node configuration information table (management table on the part of the hub station), 143 a receiver, 144 a node configuration information detection means, 145 a node configuration information modifying/extracting means, 146 a node configuration information creating means, and 147 a transmitter.

The value in the counter (C) 141 is incremented by one when the node configuration information table in the hub station 12 is updated as a whole. The node configuration information table 142 is a table for managing the node configuration information in the wireless bus 11. The details of the node configuration information table 142 will be described later by referring to FIG. 24. The node configuration information detection means 144 has the function of detecting the node configuration modification notifying packet 110 in the node configuration modification region, the count transmission region 131 in the data region, and the node configuration information update packet 120 in the signal frame received by the receiver 143. The node configuration information modifying/extracting means 145, when the node configuration information detection means 144 detects a notification of node configuration modification, accesses the node configuration information table 142 and then modifies or extracts information in the table 142.

The node configuration information creating means 146 creates a node configuration information update packet 120 for a node that the hub station 12 has decided requires retransmission. It also creates a frame start packet 100 that is necessary when configuring a frame. The transmitter 147 has the function of transmitting a transmission signal created by the node configuration information creating means 146. The transmitter 147 includes a memory device (queue) for the temporary storage of packets.

Figure 23:
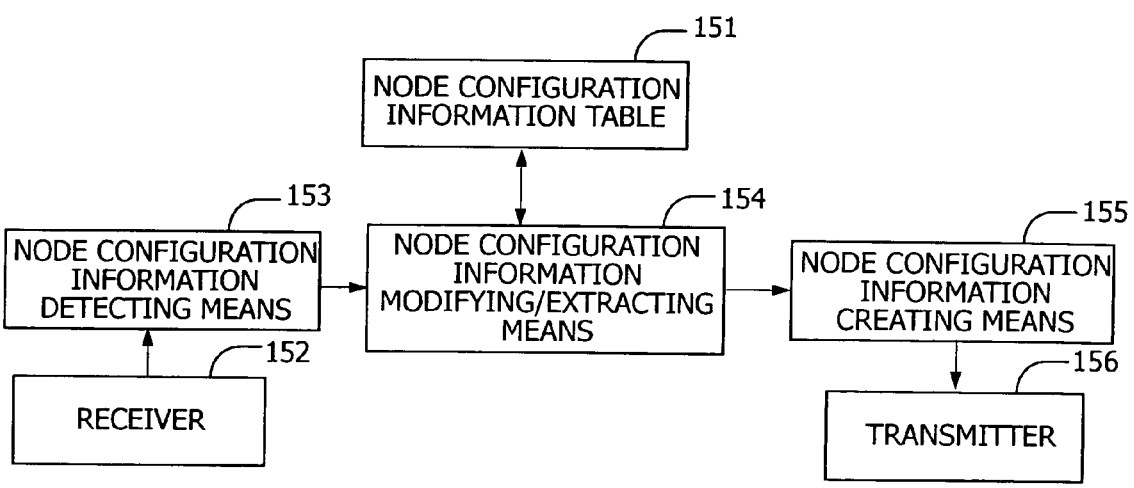
FIG. 23 shows node configuration information managing blocks on the part of a node according to the node configuration information management method in the second embodiment.

FIG. 23 shows the node configuration information management blocks on the part of a node for realizing the node configuration management method according to the present embodiment, the figure corresponding to FIG. 8. In FIG. 23, numeral 151 designates a node configuration information table (management table on the part of a node), 152 a receiver, 153 a node configuration information detection means, 154 a node configuration information modifying/extracting means, 155 a node configuration information creating means, and 156 a transmitter.

The node configuration information table 151 is a table for managing the node configuration information in the wireless bus 11 that is received from the hub station 12. The details of the node configuration information table 151 will be described later by referring to FIG. 25. The node configuration information detection means 153 has the function of detecting the frame start packet 100 in the frame start region and the node configuration information update packet 120 in the data region in the signal frame received by the receiver 152. The node configuration information modifying/extracting means 154, when the node configuration information detection means 153 receives the node configuration information update packet 120, accesses the node configuration information table 151 and then modifies or extracts information in the table 151. It also has the function of extracting the count (C_[Node]) of the node from the node configuration information table 151.

The node configuration information creating means 155 has the function of transmitting, in each frame, the count (C_[Node]) of the node in the node configuration information table 151 that is extracted by the node configuration information modifying/extracting means 153. It also creates the node configuration modification notifying packet 110 for notifying the hub station 12 of any modifications in the node configuration. The transmitter 156 has the function of transmitting a transmission signal created by the node configuration information creating means 155. The transmitter 156 has a memory device (queue) for the temporary storage of packets.

FIG. 24 shows in detail the node configuration information table 142 possessed by the hub station 12. In the figure, values in <> are examples. As shown, the node configuration information table 142 in the hub station records the current count (C), the node number (#Node), the count (C_[Hub (#Node)]) upon updating for each node number, the count (C_[Hub(#Node)]) on the part of a node for each node number, and node information for each node number.

The value of the current count (C) is incremented by one when the node configuration information or the node information is updated, such as when a node is newly registered in the wireless bus 11, when a node is deleted, or when the function of a node is modified. As many node numbers (#Node) are provided as the maximum number of nodes that can be stored in the wireless bus 11. The counts (C_[Hub (#Node)]) at updating are associated with node numbers. In this region, the count (C) that exists when the node configuration information or node information associated with a particular number is updated is stored. As many node counts (C_[Node(#Node)]) are provided as there are nodes. In this region, the count for each node in the wireless bus 11 that has been transmitted in the count transmission region 131 in each frame is stored. The node information (unique identifier +system parameters) is a region where the hub station 12 secures the node information that has been transmitted from a node in the above-mentioned node configuration modification notifying region. Based on this node information, the hub station 12 overwrites the node configuration information table 142.

FIG. 25 shows in detail the structure of the node configuration information table 151 possessed by a node. In the figure, values in <> are examples. As shown in FIG. 25, the node configuration information table 151 for each node stores the count (C_[Node]) upon updating, the node number (#Node), and the node information for each node.

The count (C_[Node]) upon updating is where the current count (C) that the node acquires when receiving the node configuration information update packet 120 from the hub station 12 is stored. The count (C) therefore indicates when the last update took place. The contents of the node number (#Node) and the node information are the same as those of the node number (#Node) in the node configuration table 142 on the part of the hub station 12. The node receives the node configuration information update packet 120 transmitted from the hub station 12, acquires the updated node configuration information, and then overwrites the updated portion.

Hereafter, the operation of the node configuration information management method described above will be described in more detail.

Figure 26:
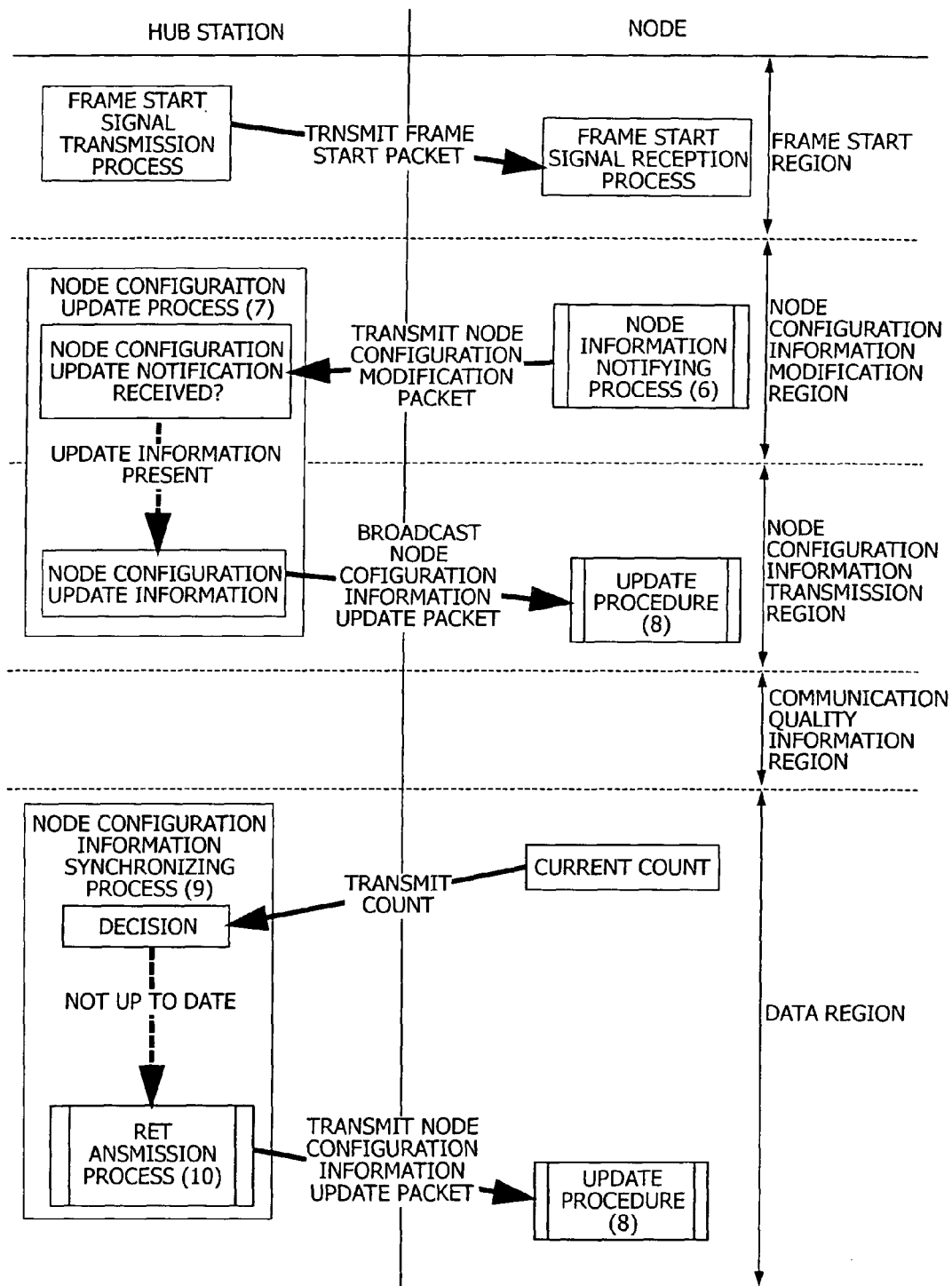
FIG. 26 shows a node configuration information managing sequence according to the node configuration information management method in the second embodiment of the invention.

First, the sequence for synchronizing node configuration information in the wireless bus 11 will be described. FIG. 26 illustrates the node configuration information managing sequence, which corresponds to the node configuration information managing sequence illustrated in FIG. 11.

<Frame Start Packet Transmission Process>

In the frame start region 91, the hub station 12 transmits a head position detection signal 101 and a size notification 102 using the frame start packet 100 shown in FIG. 18.

<Frame Start Packet Reception Process>

A node that has received the frame start packet 100 acquires the head position detection signal 101, identifies the head position, and identifies the subsequent frame structure based on the size notifying signal 102.

<Node Information Notifying Process (6)>

If there is a modification in the configuration information in a node in the wireless bus 11, the node transmits the node configuration modification notifying packet 110 to the hub station 12 in the node configuration information modification region 92.

<Node Configuration Update Process (7)>

Upon reception of the node configuration modification packet 110, the hub station 12 updates its own node configuration information table 142. Then, the hub station 12 broadcasts the node configuration information update packet 120 to which the current count (C) is attached to all of the nodes in the wireless bus 11 in the node configuration information transmission region 93.

<Update Procedure (8)>

A node that has received the node configuration information update packet 120 acquires the current count (C) of the hub station 12 and the node update information, and then updates its own node configuration information table 151. In the count transmission region 131, the count (C_[Node]) carried by the node is transmitted to the hub station 12, thus notifying the hub station 12 of the update situation in the table (node configuration information table 151) of the node.

<Node Configuration Information Synchronizing Process (9)>

Having acquired the count (C_[Node]) of each of the nodes in the wireless bus 11 and updated the table (node configuration information table 142) via the count transmission region 131, the hub station 12 compares the acquired counts with its own current count (C) to determine whether or not all of the tables have been updated. If there is a table that has not been updated, the hub station 12 carries out a retransmission process (10) using the data region 95. In this retransmission process (10), the node configuration information update packet 120 is transmitted to the node that is not updated. The node that has received the node configuration information update packet 120 performs the update procedure (8). Specifically, the node overwrites the node configuration information table 151 based on the count (C) and the node information in the packet.

Hereafter, each of the process sequences (6) to (10) shown in FIG. 26 will be described by referring to a flowchart.

<Sequence of the Node Information Modification Notifying Process (6) on the Part of a Node>

Figure 27:
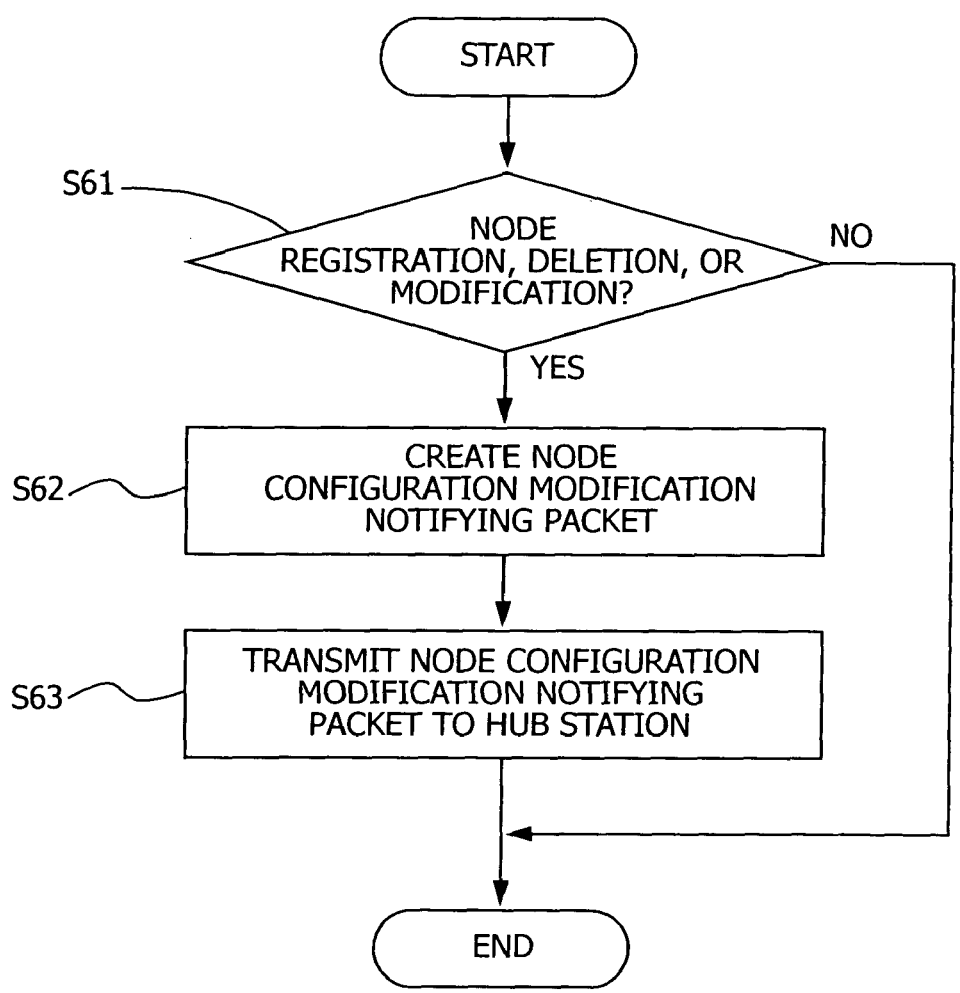
FIG. 27 shows a flowchart of the sequence of a node information notifying process (6) on the part of a node according to the node configuration information management method in the second embodiment of the invention.

FIG. 27 shows a flowchart of the node information notifying process (6) sequence on the part of a node in the node configuration information managing sequence shown in FIG. 26.

Initially, in step S61, the node determines if it is newly registered or deleted, or if there is any modification in the system parameters. If there is no modification, the process comes to an end. If there is a modification, a node configuration modification notifying packet 110 is created in step S62. After adding the type of modification (registration, deletion, or modification), unique identifier, and system parameters, the node configuration modification notifying packet 110 is transmitted to the hub station 12 in step S63, and then the process comes to an end.

<Sequence of the Node Configuration Update Process (7) on the Part of the Hub Station 12>

Figure 28:
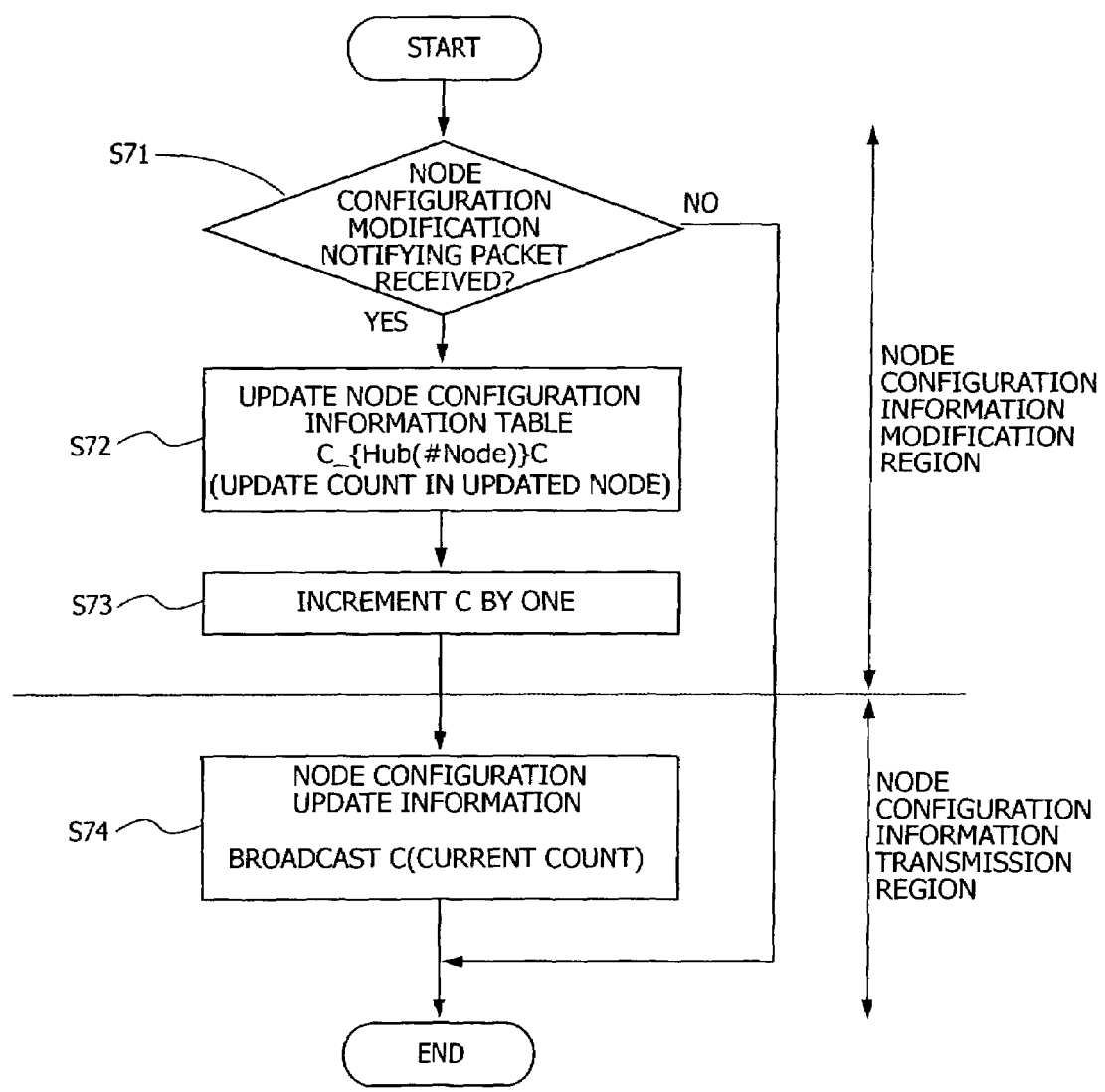
FIG. 28 shows a flowchart of the sequence of a node configuration update process (7) on the part of the hub station according to the node configuration information management method in the second embodiment of the invention.

FIG. 28 shows a flowchart of the node configuration update process (7) sequence on the part of the hub station 12 in the node configuration information managing sequence shown in FIG. 26.

In step S71, the hub station 12 determines whether or not it has received the node configuration modification notifying packet 110. If not, the process comes to an end. If it has received the node configuration modification notifying packet 110, it updates its own node configuration information table 142 in the hub station 12 in step S72, and overwrites the current count (C) on the count (C_[Hub (#Node)]) where updated. Thereafter, the hub station 12 increments the count (C) by one in step S73, creates a node configuration information update packet 120 in the node update information transmission region in step S74, and broadcasts it to all of the nodes in the wireless bus 11, before the process comes to an end.

<Sequence of the Update Procedure (8) on the Part of a Node>

Figure 29:
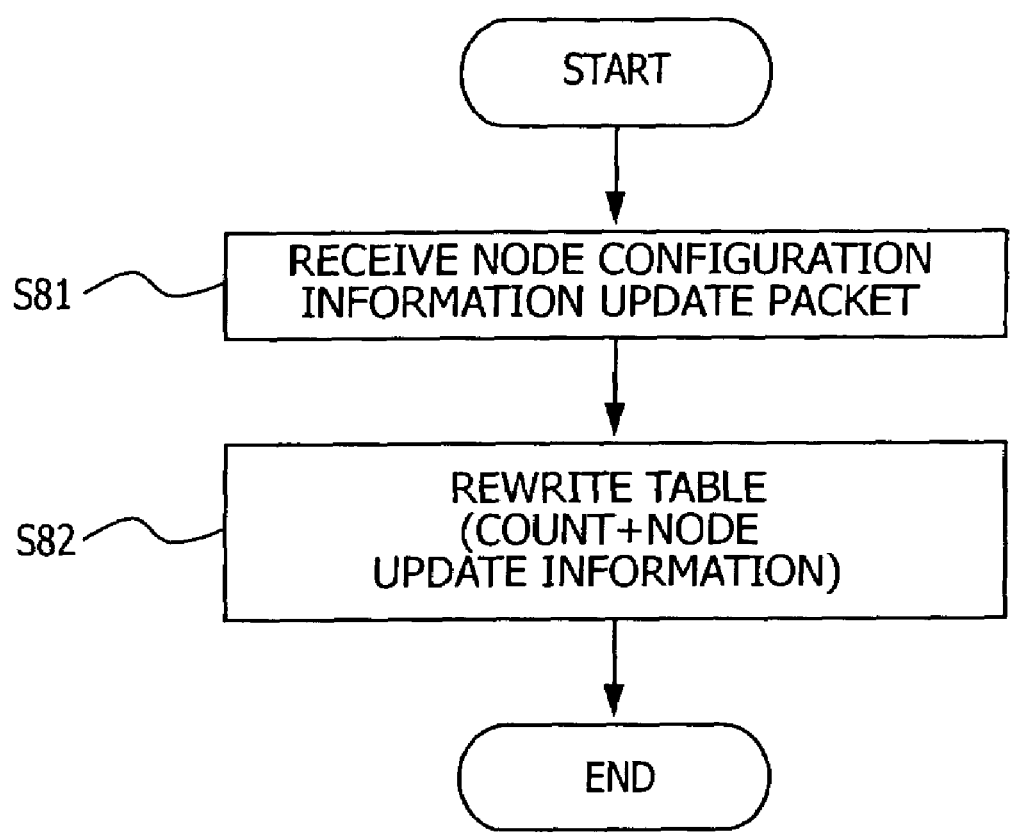
FIG. 29 shows a flowchart of the sequence of an update procedure (8) on the part of a node according to the node configuration information management method in the second embodiment of the invention.

FIG. 29 shows a flowchart of the sequence of the update procedure (8) on the part of a node in the node configuration information managing sequence shown in FIG. 26.

In step S81, the node receives the node configuration information update packet 120 from the hub station 12. In step S82, the node acquires the count (C) and the node update information, and then overwrites its own node configuration information table 151 to complete the process.

<Sequence of the Node Configuration Information Synchronizing Process (9) on the Part of the Hub Station 12>

Figure 30:
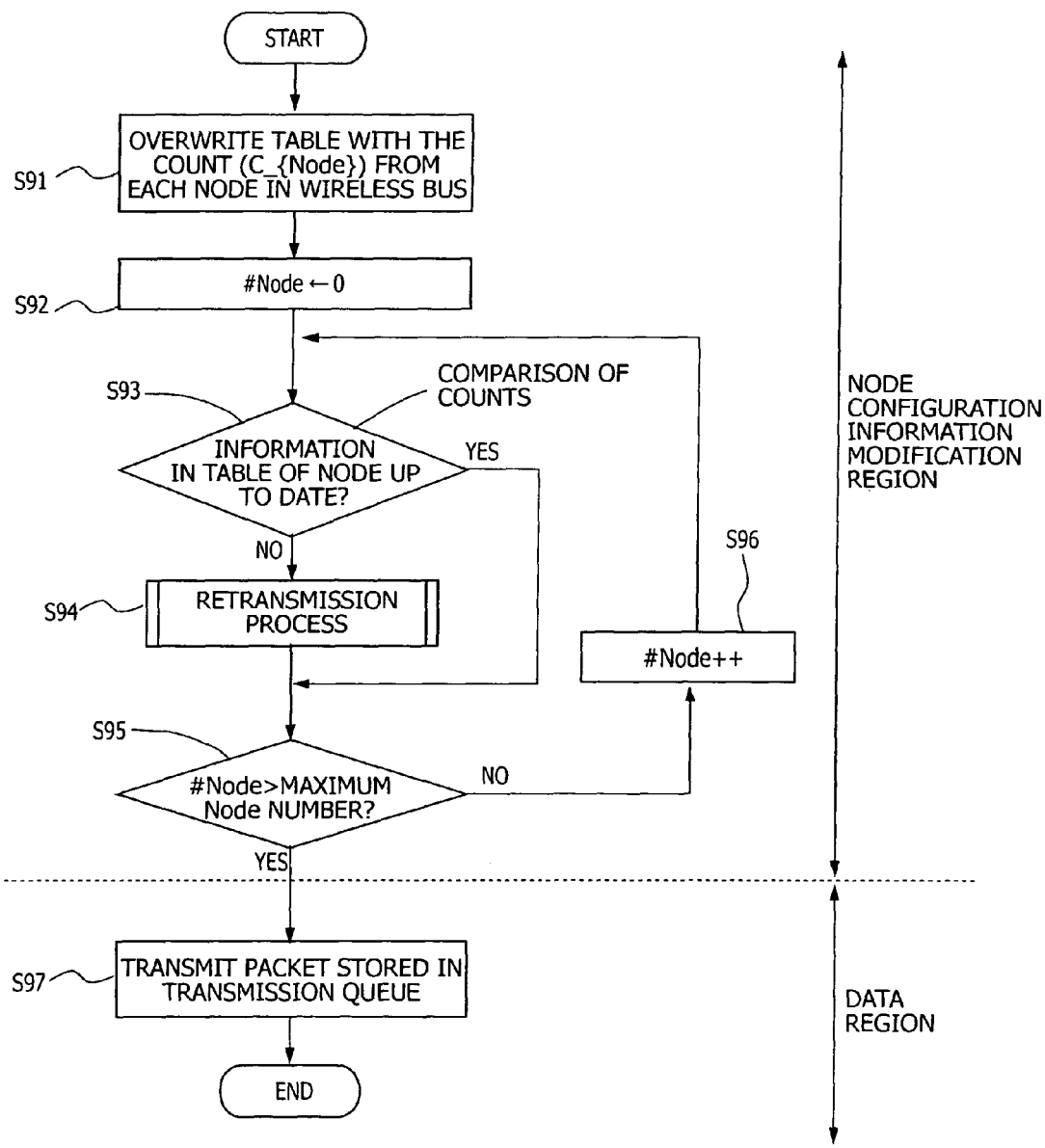
FIG. 30 shows a flowchart of the sequence of a node configuration information synchronizing process (9) on the part of the hub station according to the node configuration information management method in the second embodiment of the invention.

FIG. 30 shows a flowchart of the sequence of the node configuration information synchronizing process (9) on the part of the hub station 12 in the node configuration information managing sequence shown in FIG. 26.

In step S91, the hub station 12 acquires the count in each of the nodes in the wireless bus 11 that was transmitted in the count transmission region, and then updates the counts (C_[Node]) in its own node configuration information table 142. Thereafter the hub station 12 makes the node number (#Node) zero in step S92.

In step S93, the node count (C_[Node]) and the current count (C) in the node configuration information table are compared in order to determine whether the table in the node has been updated. Based on this comparison of the counts, a decision is made as to the advisability of retransmission to each node starting from the node number zero (#Node←0). When the table of the node is up to date, the process goes to step S95 to end the process on this particular node. If the table of the node is not up to date, a retransmission process (10) is performed in step S94, before the process on this particular node comes to an end. The details of the retransmission process (10) will be described later by referring to FIG. 31.

In step S95, it is determined whether the node number (#Node) has exceeded the maximum node number. If not, the node number (#Node) is incremented to the next node (#Node++) in step S96 for carrying out a retransmission process for the next node. The sequence then returns to step S93, from which the above operation is repeated for all of the nodes. When the node number (#Node) has exceeded the maximum node number, it is decided that the operation has been performed on all of the registered nodes. Then, the data that was stored in the queue in the retransmission process (in step S94) is transmitted to the node in need of retransmission in step S97, thus concluding the present process.

<Sequence of the Retransmission Process (10) on the Part of the Hub Station 12>

Figure 31:
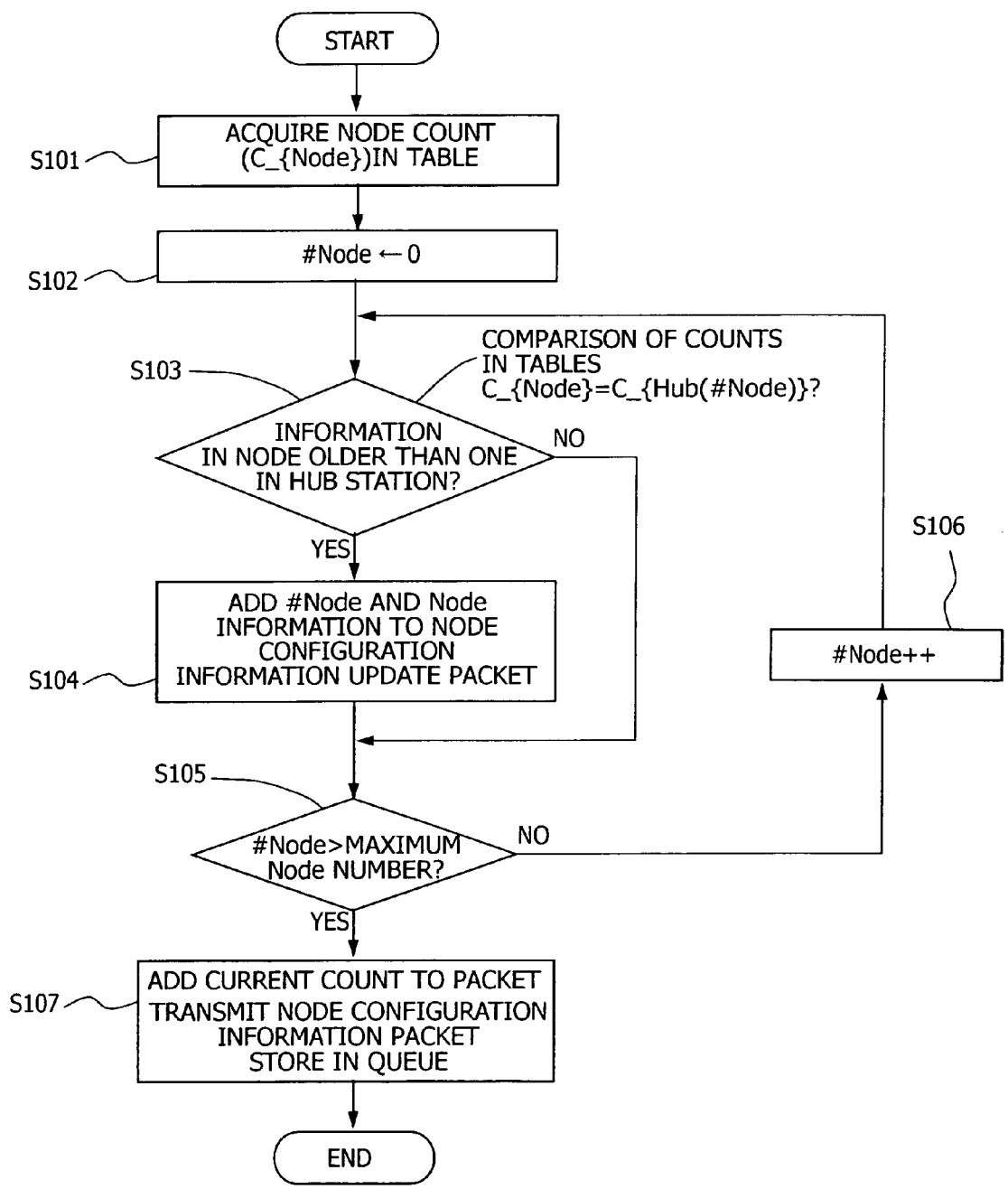
FIG. 31 shows a flowchart of the sequence of a retransmission process (10) on the part of the hub station according to the node configuration information management method in the second embodiment of the invention.

FIG. 31 shows a flowchart of the sequence of the retransmission process (10) on the part of the hub station 12 in the node configuration information managing sequence shown in FIG. 26.

Initially, in step S101, the hub station 12 acquires the count (C_[Node]) of the node in the node configuration information table 142. In step S102, the hub station 12 makes the node number (#Node) zero. Then, in step 103, the hub station 12 compares the acquired count (C_[Node]) with the count (C_[Hub(#Node)]) stored in its own node configuration information table 142 on a node-by-node basis. Based on this comparison of the counts, it is determined whether the information possessed by the node is older than that owned by the hub station 12.

If the acquired count (C_[Node]) of the node is older than the count (C_[Node]) in the table of the hub station 12, the hub station, deciding that the node information concerning the particular node must be transmitted, inserts this node (#Node) and the node information into the node configuration information update packet 120 in step S104 The sequence then proceeds to step S105. If the decision in step S103 is negative, the sequence goes to step S105.

In step S105, it is determined whether the node number (#Node) has exceeded the maximum node number. If not, the node number (#Node) is incremented for the next node (#Node++) for carrying out a retransmission process therefor. The sequence then returns to step S103, and the above operation is performed for all of the nodes.

When the node number (#Node) exceeds the maximum node number, it is decided that the operation has been performed on all of the registered nodes, and the current count (C) is added to the packet in the final step S107. After the node configuration information packet is stored in the transmission queue, the process comes to an end.

In order to ensure the completeness of or to simplify the data, all items of the node configuration information currently owned by the hub station may be transmitted without carrying out the above sequence.

If the various packets cannot be transmitted in the same frame in the sequences (1) to (10) because the node configuration information size is large, for example, the transmission may begin after waiting for the beginning of relevant regions in the next frame.

Thus, in accordance with the node configuration information management method in the second embodiment, when the node configuration information table 142 in the hub station 12 is updated as a result of a change in the node configuration in the wireless bus 11, the hub station 12 broadcasts the update information in the node configuration information table 142 and update timing to all of the nodes in the wireless bus 11. Each node in the wireless bus 11 receives the update information and then updates its own node configuration information table 151 including the update timing and the node configuration information. Each node in the wireless bus 11 notifies the hub station 12 of the update timing. Based on the reported update timing, the hub station 12 recognizes the update situation in the node configuration information table 151 in each node. If there is a node that is not updated, the hub station 12 retransmits the update information to that node. In this manner, even a node that failed to receive the broadcast signal can maintain synchronization with the hub station 12 between the node configuration information tables 142 and 151.

The modification notifying sequence on the part of the nodes is the same as that in Embodiment 1. Thus, the hub station 12, in response to a modification notification from a node, broadcasts the node configuration information update packet 120 including the current count (C) and the update information in the same frame to all of the nodes in the wireless bus 11.

Each node receives the broadcast signal and then updates its own node configuration information table 151. The node then notifies the hub station 12 of the current count in the node in each frame. The hub station 12 acquires the count from each of the nodes in the wireless bus 11, and compares it (C_[Node]) with the current count (C) in the node configuration information table 142. The hub station 12 does nothing with respect to a node that has the same count. When the counts are different, the hub station 12 decides that the node is out of synchronization, and creates differential data corresponding to the node's count (C_[Node]). The hub station 12 then transmits a node configuration information update packet 120 including the current count (C) to the particular node. The node that has received the update data updates its own node configuration information table 151, so that it is synchronized with the node configuration information table 142 managed by the hub station 12.

In accordance with the present embodiment, the node configuration information table 142 managed by the hub station 12 can be synchronized with all of the nodes in the wireless bus 11 within a minimum one frame, so that no invalid data is created during synchronization. Further, because the hub station 12 can recognize the update situation in each node in the wireless bus 11, the hub station can decide whether or not a retransmission is necessary for any of the nodes.

INDUSTRIAL APPLICABILITY

Thus, in accordance with the invention, the hub station centrally manages the node configuration information in a wireless bus comprising the hub station and a plurality of nodes, so that the hub station can share the latest node configuration information with all of the nodes.

Further, in accordance with the invention, the hub station centrally manages the node configuration information in a wireless bus comprising the hub station and a plurality of nodes, so that the hub station can share the latest node configuration information with all of the nodes in the wireless bus within the shortest frame.

The invention claimed is:

1. A method of managing the node configuration in a wireless network comprising a hub station and a plurality of nodes, wherein
the hub station comprises a hub station management table for managing unique information about each of the nodes, wherein the updating of the hub station management table is managed by first update timing information that is transmitted to all of the nodes periodically, wherein if the hub station management table is modified, modification information is transmitted to all of the nodes together with the first update timing information, wherein
each node has a node management table for managing the unique information about the node, wherein the node receives the first update timing information and the update information, compares first update timing information in its own management table with the first update timing information transmitted from the hub station, and rewrites its own management table based on the update information if its own update timing information is older.

2. A method of managing the node configuration in a wireless network comprising a hub station and a plurality of nodes, wherein
the hub station has a hub station management table for managing unique information about each of the nodes, wherein updating of the hub station management table is managed based on first update timing information that is transmitted to all of the nodes periodically, wherein
each node has a node management table for managing the unique information about the node, wherein the node receives the first update timing information and compares first update timing information in its own management table with the first update timing information transmitted from the hub station, wherein the node requests the transmission of the unique information data if its own update timing information is old, and rewrites its own management table based on the unique information data transmitted from the hub station in response to the request.

3. The node configuration management method according to claim 2, wherein the unique information data transmitted from the hub station in response to the request from the node for the transmission of the unique information data is differential data including only that data in the unique information which relates to a node that has been added, modified, or deleted subsequent to the update timing information carried by the node.

4. The node configuration management method according to claim 2, wherein the first update timing information is sequentially updated, wherein, if the first update timing information of the node is older than the first update timing information transmitted from the hub station by two or more, the node requests the hub station, together with the update timing information of its own, to transmit the relevant differential data.

5. A method of managing the node configuration in a wireless network comprising a hub station and a plurality of nodes, wherein
the hub station has a hub station management table for managing unique information about each node, wherein updating of the hub station management table is managed based on first update timing information, wherein
each node has a node management table for managing the unique information about each node, wherein the updating of the node management table is managed based on the first update timing information, the node periodically transmitting the first update timing information that it manages to the hub station, wherein
the hub station compares its own first update timing information with the first update timing information transmitted from each node periodically, the hub station creating the unique information data if the two items of information are different and transmitting it to the corresponding node, wherein
the node rewrites its own management table based on the data transmitted from the hub station.

6. The node configuration management method according to claim 5, wherein the hub station compares the first update timing information periodically transmitted from each node with its own first update timing information, and if there is a difference, the hub station creates unique information differential data corresponding to the difference and transmits it to the relevant node.

7. The node configuration management method according to claim 5, wherein the hub station periodically transmits the first update timing information to all of the nodes and, if the management table is modified, the hub station transmits modification information to all of the nodes together with the first update timing information.

8. The node configuration management method according to claim 5, wherein a frame structure for wireless transmission includes a region for transmitting the unique information about each node, a region for the hub station to transmit modified portion of the unique information to all of the nodes, and a data region for transmitting and receiving normal data, wherein the nodes make retransmission requests to the hub station individually by using the data region, the hub station transmitting differential data in response to the retransmission request using the data region.

9. The node configuration management method according to claim 1 or 4, wherein the hub station manages updating of the unique information about each node based on second update timing information in the hub station management table, wherein the hub station compares the first update timing information transmitted from each node with the second update timing information of the relevant node in order to select differential data.

10. The node configuration management method according to claim 1 or 2, wherein a frame structure for wireless communication includes a region for transmitting the first update timing information managed by the hub station to all of the nodes, a region for transmitting the unique information about each node, a region for the hub station to transmit modified portion of the unique information to all of the nodes, and a data region for transmitting and receiving normal data, wherein each node makes a retransmission request to the hub station individually using the data region, the hub station transmitting differential data in response to the retransmission request using the data region.

11. A wireless network system comprising a hub station and a plurality of nodes, wherein the hub station comprises a hub station management table for managing unique information about each node based on first update timing information, a detection means for detecting a modification in the node configuration, an update means for updating the hub station management table in accordance with the result of detection by the detection means, and a transmitter for transmitting, if there is a modification in the hub station management table, modification information to all of the nodes together with the first update timing information, as well as transmitting the first update timing information to all of the nodes periodically, wherein each node comprises a node management table for managing the unique information about the node based on the first update timing information, a receiver for receiving the first update timing information, and an update means for comparing the first update timing information in the node management table of the node with the first update timing information transmitted from the hub station and for updating, if the update timing information of the node is old, its own node management table based on the modification information.

12. A wireless network system comprising a hub station and a plurality of nodes, wherein the hub station comprises a hub station management table for managing unique information about each node based on first update timing information, a detection means for detecting a modification in the node configuration, an update means for updating the hub station management table in accordance with the result of detection by the detection means, and a transmitter for transmitting the first update timing information to all of the nodes periodically, wherein each node comprises a node management table for managing the unique information about the node based on the first update timing information, a receiver for receiving the first update timing information, a data transmission request means for comparing the first update timing information in the node management table of the node with the first update timing information transmitted from the hub station and for requesting, if the update timing information of the node is old, the transmission of the unique information data, and an update means for updating its own node management table based on the unique information data transmitted from the hub station in accordance with the request.

* * * * *